(12) United States Patent
Kataoka et al.

(10) Patent No.: US 11,749,103 B2
(45) Date of Patent: Sep. 5, 2023

(54) SIGNAL PROCESSING DEVICE

(71) Applicant: OMRON Corporation, Kyoto (JP)

(72) Inventors: Nobuo Kataoka, Kyoto (JP); Seiji Mizutani, Kyoto (JP)

(73) Assignee: OMRON Corporation, Kyoto (JP)

( * ) Notice: Subject to any disclaimer, the term of this patent is extended or adjusted under 35 U.S.C. 154(b) by 83 days.

(21) Appl. No.: 17/618,875

(22) PCT Filed: Feb. 26, 2020

(86) PCT No.: PCT/JP2020/007817
§ 371 (c)(1),
(2) Date: Dec. 13, 2021

(87) PCT Pub. No.: WO2021/005824
PCT Pub. Date: Jan. 14, 2021

(65) Prior Publication Data
US 2022/0262234 A1 Aug. 18, 2022

(30) Foreign Application Priority Data
Jul. 8, 2019 (JP) .................................. 2019-127094

(51) Int. Cl.
*G08C 19/00* (2006.01)
(52) U.S. Cl.
CPC .................................... *G08C 19/00* (2013.01)
(58) Field of Classification Search
CPC ......... G08C 19/00; G05B 19/042; G06F 3/14; H04B 2210/072; H04B 2210/077;
(Continued)

(56) References Cited

U.S. PATENT DOCUMENTS 3,659,277 A * 4/1972 Brown .................... H04B 3/548
340/870.2
7,069,025 B2 * 6/2006 Goren .................. H04Q 3/0025
340/8.1
(Continued)

FOREIGN PATENT DOCUMENTS

JP S56165435 12/1981
JP H05266392 10/1993
(Continued)

OTHER PUBLICATIONS

"International Search Report (Form PCT/ISA/210) of PCT/JP2020/007817," dated Apr. 7, 2020, with English translation thereof, pp. 1-4.
(Continued)

*Primary Examiner* — Adnan Aziz
(74) *Attorney, Agent, or Firm* — JCIPRNET

(57) ABSTRACT

A signal processing device includes: a superposing circuit for generating a superposed signal obtained by superposing a data signal indicative of prescribed information on an operation signal relating to an operation element of an electric apparatus; an information storage part for storing the prescribed information; a signal transmission terminal for inputting/outputting the operation signal or the superposed signal to/from the electric apparatus or apparatus control devices; and an information transmission terminal for inputting/outputting information to/from an information transfer device which executes reading of information stored in the information storage part and/or writing of information in the information storage part. The signal processing device is connected to an external device via a connector member. Each of the terminals is provided in an area that is inside the connector member in a state where the signal processing
(Continued)

device is connected to the external device via the connector member.

12 Claims, 22 Drawing Sheets

(58) Field of Classification Search
CPC ........ H04B 10/27; H04J 7/00; H04L 25/4917; H04L 25/4902; H04L 25/49; H04L 25/0262
See application file for complete search history.

(56) References Cited

U.S. PATENT DOCUMENTS

| | | | | |
|---|---|---|---|---|
| 9,531,438 B2* | 12/2016 | Mori | ......................... | H04B 3/50 |
| 10,270,489 B2* | 4/2019 | Kearney | .............. | H05B 47/185 |
| 2003/0069713 A1* | 4/2003 | Friedl | .................... | G01D 3/022 |
| | | | | 702/127 |
| 2006/0277586 A1* | 12/2006 | Baba | ...................... | G09G 5/006 |
| | | | | 725/118 |
| 2010/0061545 A1* | 3/2010 | Kitchin | ................. | H04B 3/548 |
| | | | | 379/413 |
| 2010/0119236 A1* | 5/2010 | Uno | .................... | H04B 10/801 |
| | | | | 398/141 |
| 2011/0176559 A1* | 7/2011 | Mori | ........................ | H04B 1/74 |
| | | | | 370/464 |
| 2012/0246399 A1* | 9/2012 | Nishi | ................... | G06F 12/0246 |
| | | | | 711/E12.008 |
| 2013/0103959 A1* | 4/2013 | Hatta | ........................ | G06F 1/26 |
| | | | | 713/300 |
| 2015/0381237 A1* | 12/2015 | Griffith | .................. | H04H 20/38 |
| | | | | 375/258 |
| 2016/0266563 A1* | 9/2016 | Mizutani | ............ | G05B 19/0421 |
| 2018/0267912 A1* | 9/2018 | Kataoka | ................. | H04B 3/548 |
| 2019/0004106 A1 | 1/2019 | Harada et al. | | |
| 2020/0162164 A1* | 5/2020 | Tanaka | ................... | H04B 10/40 |

FOREIGN PATENT DOCUMENTS

| | | |
|---|---|---|
| JP | 2003185493 | 7/2003 |
| JP | 2018151915 | 9/2018 |
| JP | 2019012906 | 1/2019 |

OTHER PUBLICATIONS

"Written Opinion of the International Searching Authority (Form PCT/ISA/237) of PCT/JP2020/007817," dated Apr. 7, 2020, with English translation thereof, pp. 1-6.
IO-Link Community, "IO-Link Interface and System Specification", Version 1.1.2, Order No. 10.002, Jul. 2013, pp. 1-262.
"Search Report of Europe Counterpart Application", dated Jun. 29, 2023, pp. 1-7.

* cited by examiner

SIGNAL PROCESSING DEVICE

CROSS-REFERENCE TO RELATED APPLICATION

This application is a 371 application of the International PCT application serial no. PCT/JP2020/007817, filed on Feb. 26, 2020, which claims the priority benefits of Japan Patent Application No. 2019-127094, filed on Jul. 8, 2019. The entirety of each of the above-mentioned patent applications is hereby incorporated by reference herein and made a part of this specification.

TECHNICAL FIELD

The present invention relates to a signal processing device or the like that processes electrical signals.

BACKGROUND ART

In the related art, there are three-line electric apparatuses (sensors and the like) that perform transmission and reception of communication data in addition to detection information. Such an electric apparatus requires at least two power source lines and one signal line in order to supply power and input and output signals. One three-line communication method is IO-LINK (registered trademark). Non-Patent Literature 1 is a specification of IO-Link.

CITATION LIST

Patent Literature

[Patent Literature 1]
Japanese Patent Laid-Open No. 2019-12906 (published on Jan. 24, 2019)

Non-Patent Literature

[Non-Patent Literature 1]
"IO-Link Interface and System Specification," version 1.1.2, July 2013, IO-Link Community, Order No: 10.002, 4 Overview of SDCI, p. 32 to p. 37

SUMMARY OF INVENTION

Technical Problem

However, the technique in Non-Patent Literature 1 has a problem that the number of wires increases. Also, according to the technique in Non-Patent Literature 1, a sensor converts a detection signal of the sensor into communication data and transmits the communication data to the outside. Therefore, there is a problem that the time required by the external apparatus to recognize the detection signal increases or the circuit configurations of the sensor and the external apparatus become complicated for the conversion processing.

On the other hand, using a superposed signal obtained by superposing a signal regarding an operation element with a data signal for communication to thereby reduce the number of wires can be conceived as an example of a technique for reducing the number of wires (Patent Literature 1, for example).

Incidentally, from the viewpoint of enhancing a degree of freedom in system construction and improving convenience for introducing a series of systems using superposed signals, there is progress to be made in developing the systems such that apparatuses, devices, or the like that are not compatible with communication using superposed signals can also be incorporated and used in the aforementioned series of systems.

An objective of an aspect of the present disclosure is to provide a signal processing device and the like that enable apparatuses and the like that are not compatible with communication using superposed signals to be used in a system using superposed signals.

Solution to Problem

The present invention employs the following configurations in order to solve the aforementioned problem as an example of the present disclosure.

In other words, a signal processing device according to an aspect of the present disclosure is a signal processing device that mediates communication between an electric apparatus that operates on a downstream side of a communication system and an apparatus control device that controls one or more of the electric apparatuses on an upstream side, the signal processing device including: a superposing circuit that generates a superposed signal obtained by superposing a data signal indicative of prescribed information on an operation signal in accordance with a state of operation elements of the electric apparatuses or an operation signal for controlling the operation elements; an information storage part that stores the prescribed information; a signal transmission terminal that inputs/outputs the operation signal or the superposed signal to/from the electric apparatuses or the apparatus control device; and an information transmission terminal that inputs/outputs the prescribed information to/from an information transfer device which executes at least one of reading of the prescribed information stored in the information storage part and writing of the prescribed information in the information storage part, the signal processing device is connected to an external device including the electric apparatuses, the apparatus control device, and the information transfer device via a connector member, and the signal transmission terminal and the information transmission terminal are provided in areas that are inside the connector member in a state where the signal processing device is connected to the external device via the connector member.

Advantageous Effects of Invention

According to an aspect of the present disclosure, it is possible to provide a signal processing device and the like that enable apparatuses, devices, or the like that are not compatible with communication using superposed signals to be used in a system using superposed signals.

DESCRIPTION OF EMBODIMENTS

First Embodiment

§ 1 Configuration Example Serving as Premise (Configurations of Electric Apparatus and Communication Device that are Compatible with Superposed Signals)

Figure 2:
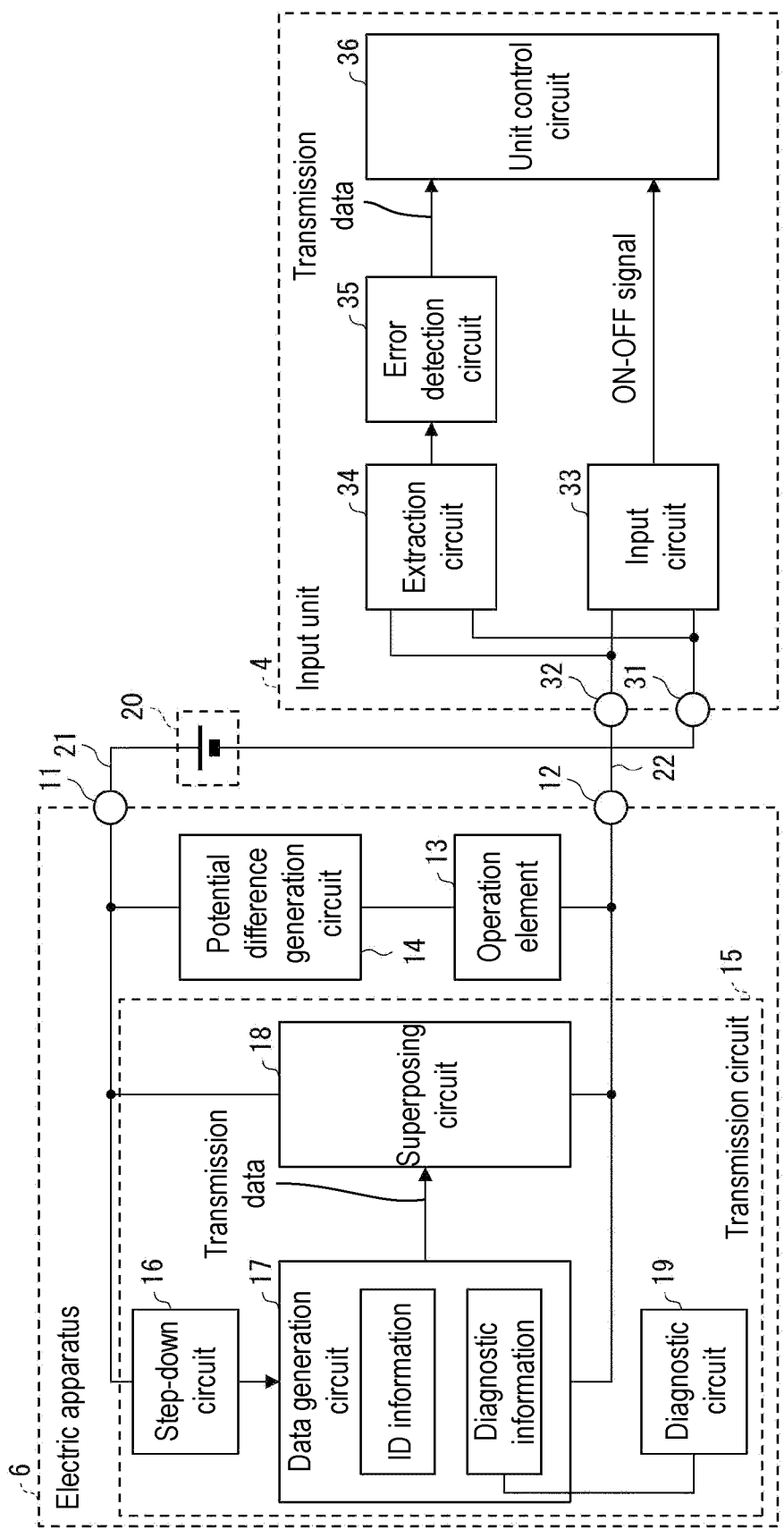
FIG. 2 is a block diagram illustrating circuit configurations of an electric apparatus that is compatible with a superposed signal and an input unit that serves as a communication device.

Before describing an electric apparatus and the like according to an aspect of the present disclosure, configurations of electric apparatuses and the like that are compatible with communication using superposed signals obtained by superposing signals regarding an operation element with data signals will be described using FIG. 2 first. FIG. 2 is a block diagram illustrating an example of circuit configurations of an electric apparatus and an input unit that is a communication device, which are compatible with superposed signals. Here, description will be given by exemplifying an electric apparatus 6 (limit switch) and an input unit 4. The electric apparatus 6 and the input unit 4 are connected to each other with a pair of signal lines 21 and 22. The signal line 21 is connected to a first input terminal 31 of the input unit 4 and an apparatus-side first terminal 11 of the electric apparatus 6. The signal line 22 is connected to a second input terminal 32 of the input unit 4 and an apparatus-side second terminal 12 of the electric apparatus 6. A power source 20 is provided in the path of the signal line 21. The power source 20 is a DC power source that generates a prescribed voltage (24 V in this case).

The electric apparatus 6 includes an apparatus-side first terminal 11, an apparatus-side second terminal 12, an operation element 13, a potential difference generation circuit 14, and a transmission circuit 15. The transmission circuit 15 includes a step-down circuit 16, a data generation circuit 17, a superposing circuit 18, and a diagnostic circuit 19. The operation element 13 is connected between the apparatus-side first terminal 11 and the apparatus-side second terminal 12. The potential difference generation circuit 14 is connected to the operation element 13 in series in a power distribution path between the apparatus-side first terminal 11 and the apparatus-side second terminal 12. The potential of the apparatus-side second terminal 12 changes in accordance with the state of the operation element 13. In other words, the apparatus-side second terminal 12 outputs an output signal (operation signal) in accordance with the state of the operation element 13 to the outside (signal line 22).

The transmission circuit 15 is connected between the apparatus-side first terminal 11 and the apparatus-side second terminal 12. The transmission circuit 15 operates using a voltage between the apparatus-side first terminal 11 and the apparatus-side second terminal 12 as a power source. The step-down circuit 16 steps down the voltage between the apparatus-side first terminal 11 and the apparatus-side second terminal 12 to a prescribed voltage and output the prescribed voltage to the data generation circuit 17. The data generation circuit 17 operates using the voltage applied from the step-down circuit 16 and generates transmission data to be transmitted to the input unit 4. The transmission data includes, for example, an identifier (ID information) unique to the electric apparatus 6. The data generation circuit 17 outputs transmission data to the superposing circuit 18. The superposing circuit 18 superposes received transmission data as a data signal with the output signal. In this manner, the transmission circuit 15 outputs the superposed signal obtained by superposing the data signal with the output signal from the second terminal 12 to the signal line 22.

The diagnostic circuit 19 operates using a voltage applied from the step-down circuit 16 and generates diagnostic data representing diagnostic information of the electric apparatus 6. The diagnostic circuit 19 includes a check circuit regarding an element (for example, the operation element 13) of the electric apparatus 6 and generates diagnostic data indicating whether or not the electric apparatus 6 operates normally in accordance with whether or not the check circuit performs output normally. The diagnostic circuit 19 outputs the diagnostic data (diagnostic information) to the data generation circuit 17. The data generation circuit 17 may include the diagnostic data in transmission data.

Figure 3:
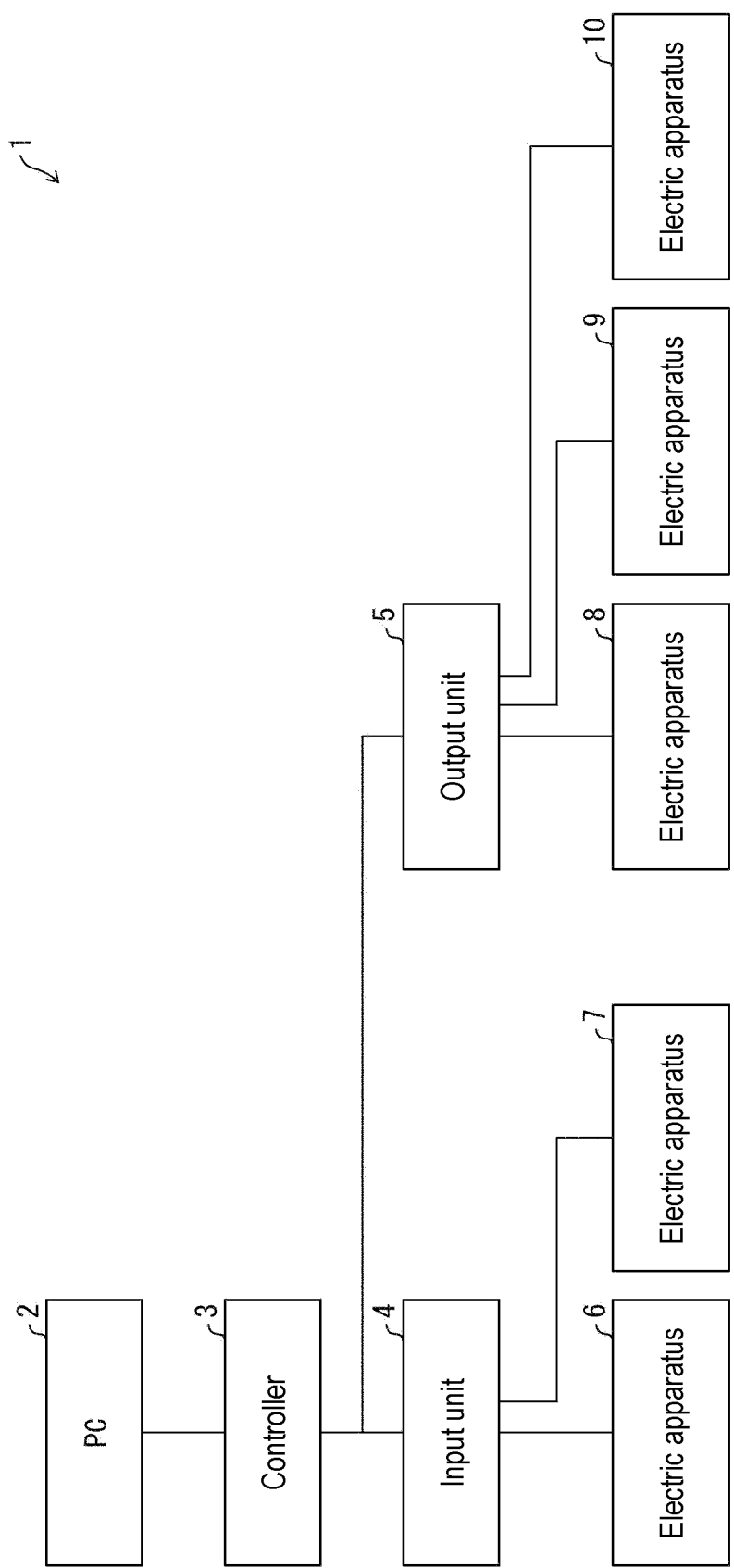
FIG. 3 is a block diagram illustrating a configuration of a control system according to an aspect of the present disclosure.

The input unit 4 includes a first input terminal 31, a second input terminal 32, an input circuit 33, an extraction circuit 34, an error detection circuit 35, and a unit control circuit 36. In FIG. 2, illustration of the configuration of a part that performs transmission to a controller 3 illustrated in FIG. 3 is omitted. The potential of the first input terminal 31 is maintained constant (at GND, for example). A superposed signal is input from the signal line 22 to the second input terminal 32.

The input circuit 33 extracts an output signal from the superposed signal and outputs the output signal to the unit control circuit 36. The extraction circuit 34 extracts a data signal from the superposed signal and outputs the data signal to the error detection circuit 35. The error detection circuit 35 performs error detection on the data signal using an arbitrary data checking method such as a CRC check (cyclic redundancy check) or Manchester code check. The error detection circuit 35 outputs the data signal and the error detection result to the unit control circuit 36. Also, the error detection circuit 35 may not output the data signal to the unit control circuit 36 in a case in which an error is detected in the data signal. The unit control circuit 36 outputs the output signal and the data signal to the controller 3. The error detection circuit 35 and the unit control circuit 36 can be configured with, for example, a single integrated circuit or a plurality of integrated circuits.

(Configuration of Communication System 1)

FIG. 3 is a block diagram illustrating a configuration of a communication system including the electric apparatus 6 that is compatible with superposed signals. A communication system 1 includes a personal computer 2 (a PC or an information processing device), the controller 3, the input unit 4, the output unit 5, and electric apparatuses 6 to 10. The PC 2 is connected to the controller 3. The PC 2 receives information regarding the electric apparatuses 6 to 10 from the controller 3 and transmits a control command to the controller 3. The controller 3 is connected to the input unit 4 and the output unit 5. The controller 3 transmits a signal for operating or controlling the electric apparatuses 6 to 10 to the input unit 4 and the output unit 5 in accordance with the control command. The controller 3 transmits signals from the electric apparatuses 6 to 10 received via the input unit 4 or the output unit 5 to the PC 2.

The input unit 4 is a receiver (communication device), is mutually communicably connected to the plurality of electric apparatuses, and can receive a superposed signal from each electric apparatus. In the illustrated example, each of the electric apparatuses 6 and 7 is connected to the input unit 4. In other words, the input unit 4 can receive superposed signals from the electric apparatuses 6 and 7. In this configuration example, the input unit 4 periodically receives data signals included in the superposed signals from the electric apparatuses 6 and 7. Also, the data signals may not be received periodically. The connection between the input unit and the electric apparatuses 6 and 7 is established by, for example, a pair of signal lines. In addition, the input unit 4 can extract data signals from the received superposed signals, determine communication states between the electric apparatuses that are transmission sources of the superposed signals and the input unit 4 itself, and output the result to the controller 3. The input unit 4 can constitute the communication system 1 as illustrated in FIG. 3 along with a plurality of apparatuses such as the electric apparatuses 6 and 7 and the controller 3.

The input unit 4 can detect whether or not it is possible to consider a communication error as having occurred in a transition period of values of the operation signals in the electric apparatuses 6 and 7 when the communication error is detected in communication with the electric apparatuses 6 and 7 in regard to the communication states with the electric apparatuses 6 and 7. Communication errors detected in periods other than the transition period include, for example, a communication error caused by repetition of instantaneous disconnection when a contact point of a switch is in an unstable state, a communication error caused by disturbance noise, and wire disconnection.

The electric apparatuses 6 and 7 operate using power supplied from the input unit 4 and transmit signals in accordance with the states of the operation elements included in the electric apparatuses 6 and 7 to the input unit 4. Here, the electric apparatus 6 is a limit switch including a switch as the operation element. The electric apparatus 7 is a sensor including a sensing element as the operation element. When the electric apparatus 6 is a limit switch and the electric apparatus 7 is a sensor, the operation element 13 can output an ON/OFF signal as an output signal (operation signal). Although the case in which the electric apparatus 6 is a limit switch will be described below, it is also possible to similarly apply the present invention to the case in which the electric apparatus 7 is a sensor.

The output unit 5 (communication device) is connected to the electric apparatuses 8 to 10. Each of the electric apparatuses 8 to 10 is connected to the output unit 5 with a pair of signal lines. The output unit 5 operates the electric apparatuses 8 to 10 and controls the electric apparatuses 8 to 10 on the basis of instructions from the PC 2 and the controller 3. Also, the output unit 5 transmits data signals received from the electric apparatuses 8 to 10 to the controller 3. The output unit 5 can receive superposed signals from the electric apparatuses 8 to 10 and extract the data signals from the received superposed signals. Moreover, the output unit 5 can determine communication states between the output unit 5 and the electric apparatuses. Then, the output unit 5 can output the determination result to the controller 3.

The electric apparatuses 8 to 10 operate using power supplied from the output unit 5 and are controlled using control signals received from the output unit 5. Here, the electric apparatus 8 is a relay apparatus including a coil as an operation element. The electric apparatus 9 is an electromagnetic valve including a coil as an operation element. The electric apparatus 10 is an electric actuator including a coil as an operation element.

(Operations of Electric Apparatus 6 and Input Unit 4 in Communication Using Superposed Signals)

Figure 4:
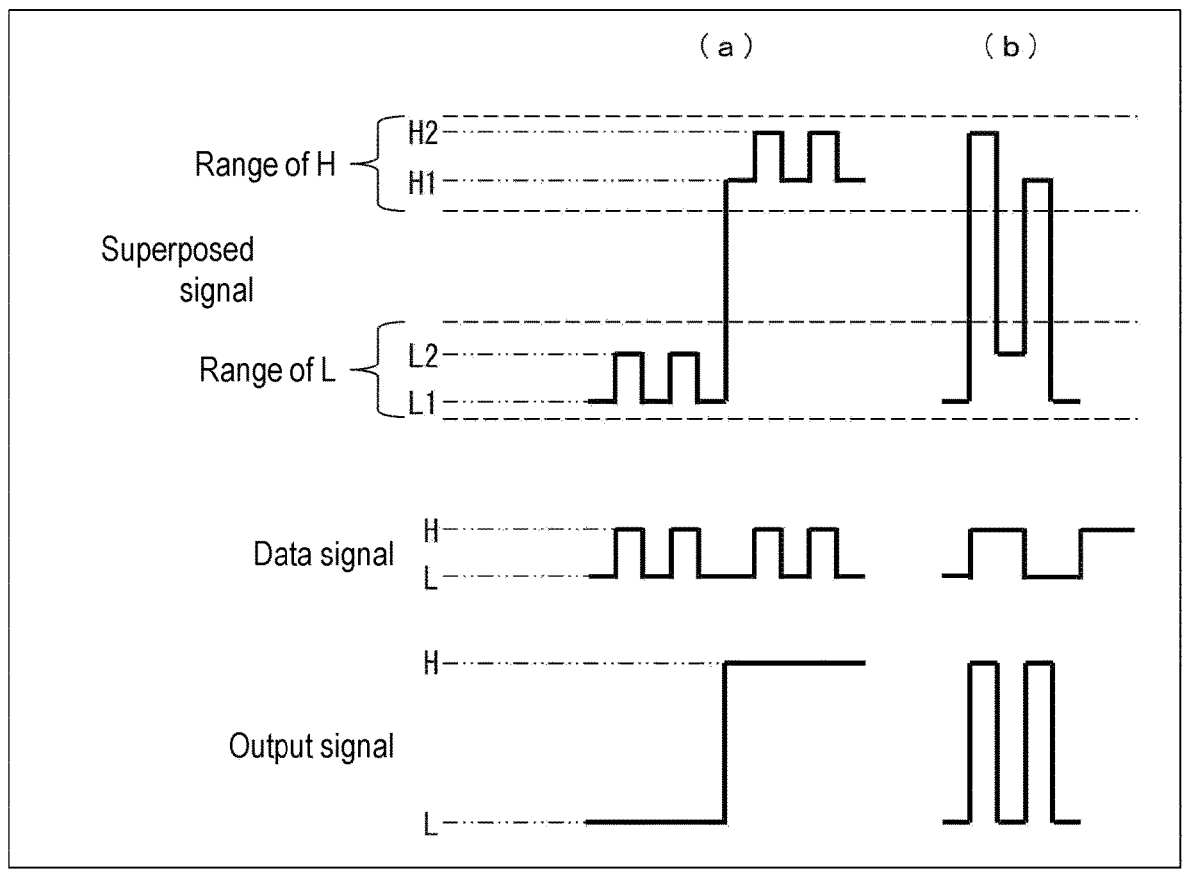
FIG. 4 is a diagram schematically illustrating an example of a signal waveform.

In regard to operations of an electric apparatus and a communication device in communication using superposed signals, an example of operations of the electric apparatus 6 and the input unit 4 will be described using FIG. 4. FIG. 4 can be similarly described for the combination of the electric apparatus 7 and the input unit 4 and also a combination of any of the electric apparatuses 8 to 10 and the output unit 5.

FIG. 4 is a diagram schematically illustrating an example of a signal waveform. In FIG. 4, (a) illustrates a case in which a cycle of an output signal (operation signal) is longer than a cycle of a data signal, and (b) illustrates a case in which the cycle of the output signal is shorter than the cycle of the data signal. A signal obtained by superposing the output signal and the data signal is the superposed signal. The waveform of the superposed signal is a waveform obtained by superposing the waveform of the output signal and the waveform of the data signal. The amplitude of the output signal is larger than the amplitude of the data signal. It is thus possible to know the value of the original output signal and the value of the original data signal from the superposed signal. Here, the output signal is H in a case in which the switch of the electric apparatus 6 is ON, while the output signal is L in a case in which the switch of the electric apparatus 6 is OFF.

Values of the superposed signal are divided into L1, L2, H1, and H2 in the ascending order. The output signal is L when the superposed signal falls within a range of L. The range of L includes L1 and L2. The output signal is H when the superposed signal falls within a range of H that is higher than the range of L. The range of H includes H1 and H2. The data signal is L in a case in which the superposed signal is L1 or H1. The data signal is H in a case in which the superposed signal is L2 or H2.

The input unit 4 receives the superposed signal from the electric apparatus 6 and then determines which of H and L the output signal is from the superposed signal (which of ON and OFF the switch of the electric apparatus 6 is). Then, the input unit 4 can extract the data signal from the superposed signal and output information in accordance with the data signal to the outside.

The input unit 4 can thus determine which of ON and OFF the switch of the electric apparatus 6 is on the basis of the superposed signal and further execute processing in accordance with the data signal.

Also, the input unit 4 can output an identifier and position information of the electric apparatus 6 along with information indicating wire disconnection and the like to the outside. The PC 2 can notify a user of a communication state between the input unit 4 and the electric apparatus 6 using three categories, for example, normal, warning, and failure, in accordance with information received from the input unit 4 via the controller 3. The user can determine whether or not to perform maintenance on the electric apparatus 6 by acquiring the information regarding the communication state between the input unit 4 and the electric apparatus 6 using the PC 2.

§ 2 Configuration Example

Since a data signal is superposed with an output signal and is then transmitted in communication using superposed signals, the electric apparatus 6, which is an apparatus that is not compatible with the communication using superposed signals (hereinafter, superposed-signal-communication-incompatible apparatus) does not transmit a data signal to the input unit 4 in a case in which the electric apparatus 6 is connected to the input unit 4 that is compatible with superposed signals, for example. In this case, since the input unit 4 cannot extract the data signal from the superposed signal, it is possible to execute only processing equivalent to that of the input unit 4 that is not compatible with superposed signals. Thus, the signal processing device according to an aspect of the present disclosure creates a superposed signal obtained by superposing prescribed information regarding the electric apparatus 6 stored in advance as a data signal with an operation signal of the electric apparatus 6 and transmits the superposed signal to the input unit 4.

(Configurations of Signal Processing Device and Information Rewriting Device)

Figure 1:
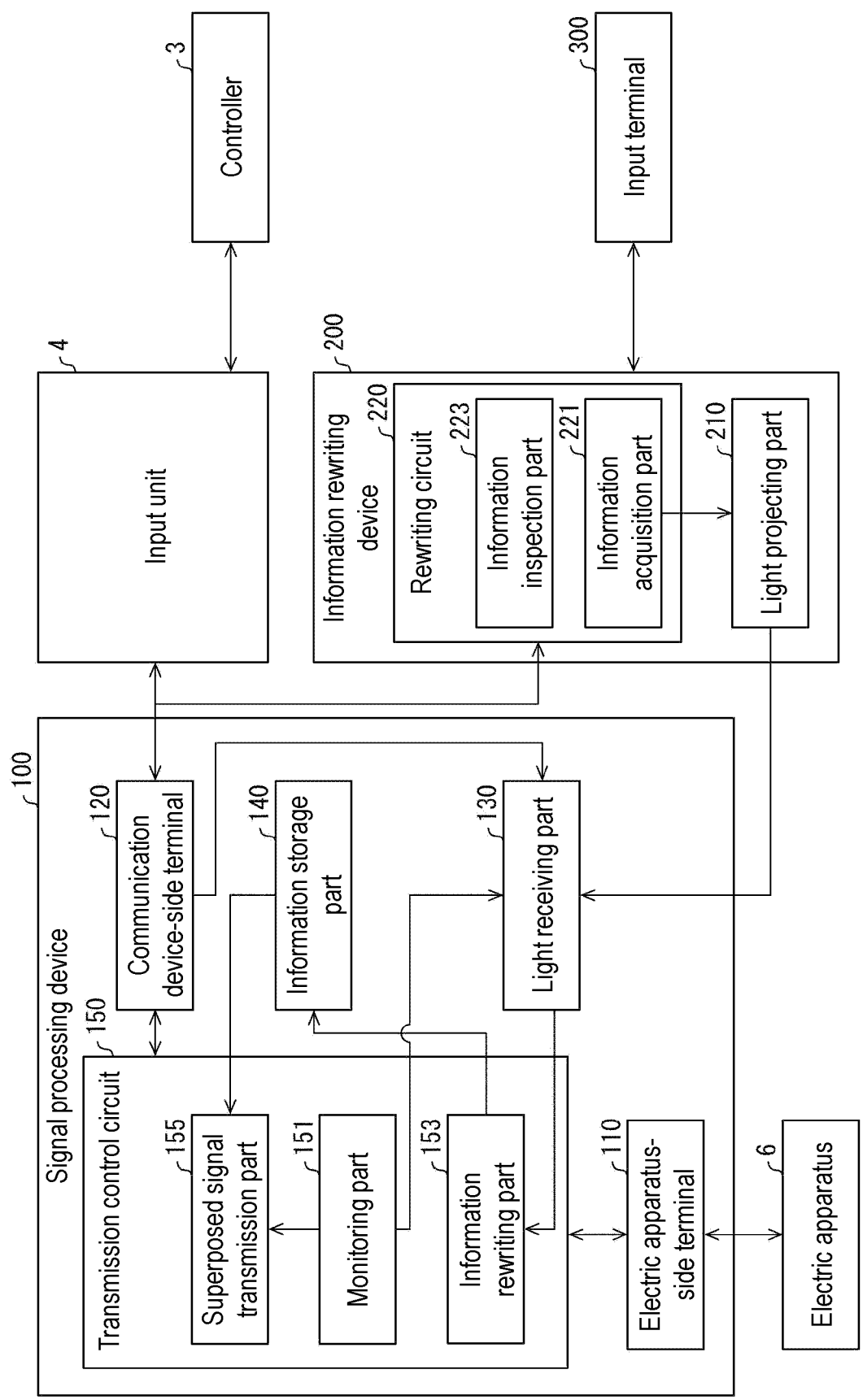
FIG. 1 is a block diagram illustrating configurations of a signal processing device and an information rewriting device according to an aspect of the present disclosure.

FIG. 1 is a block diagram illustrating configurations of a signal processing device 100 and an information rewriting device 200 according to an aspect of the present disclosure. In the following description, the input unit 4 is assumed to be compatible with communication using superposed signals. Also, the input unit 4 that is compatible with communication using superposed signals will be described below as a unit electrically connected to the electric apparatuses 6 and 7 via the signal processing device 100. However, the following description can also be applied to the output unit 5 as a unit electrically connected to the electric apparatuses 8, 9, and 10 via the signal processing device 100 on the basis of a similar technical idea. In other words, it is possible to electrically connect the output unit 5 that is compatible with communication using superposed signals to the electric apparatuses 8, 9, and 10 via the signal processing device 100. Here, each of the electric apparatuses 6 to 10 may be a superposed-signal-communication-incompatible apparatus.

The signal processing device 100 can receive prescribed information regarding the electric apparatus 6 from the information rewriting device 200 and store the prescribed information. The signal processing device 100 can generate a superposed signal by superposing the prescribed information as a data signal with an operation signal of the electric apparatus 6 and transmit the superposed signal to the input unit 4. The signal processing device 100 may have any configuration that can be disposed between the electric apparatus 6 and the input unit 4 and may have an outer shape like a communication cable, for example. The signal processing device 100 includes an electric-apparatus-side terminal 110, a communication-device-side terminal 120, a light receiving part 130, an information storage part 140, and a transmission control circuit 150. The transmission control circuit 150 includes a monitoring part 151, an information rewriting part 153, and a superposed signal transmission part 155.

The electric-apparatus-side terminal 110 is a terminal for the signal processing device 100 to transmit or receive an output signal to and from the external electric apparatus 6. The electric-apparatus-side terminal 110 and the electric apparatus 6 are connected with a communication cable or the like. The communication-device-side terminal 120 is a terminal for the signal processing device 100 to transmit or receive an output signal to or from the input unit 4. The communication-device-side terminal 120 is also a terminal for the signal processing device 100 to transmit a superposed signal to the information rewriting device 200. Although two components, that is, the input unit 4 and the information rewriting device 200, are connected to the single communication-device-side terminal 120 in the illustrated example, the communication-device-side terminal 120 can be selectively connected to either of them.

The light receiving part 130 can receive an optical signal from the outside. Specifically, the light receiving part 130 can receive prescribed information regarding the electric apparatus 6 as an optical signal from the information rewriting device 200. The light receiving part 130 may be a photo transistor (PhotoTR in FIG. 5) that generates a current when it receives light, for example, and the optical signal received by the light receiving part 130 is transmitted to the information rewriting part 153. Also, the signal processing device 100 may be provided with a window part that transmits light therethrough such that the light receiving part 130 can efficiently receive the optical signal.

The information storage part 140 can store the prescribed information regarding the electric apparatus 6. The information rewriting part 153 writes the prescribed information in the information storage part 140, and the superposed signal transmission part 155 reads the prescribed information from the information storage part 140.

The transmission control circuit 150 includes a part of the configuration of the transmission circuit 15 in FIG. 2 in addition to the monitoring part 151, the information rewriting part 153, and the superposed signal transmission part 155. In other words, the transmission control circuit 150 further includes a data generation circuit 17, a superposing circuit 18, a diagnostic circuit 19, and the like, which are not illustrated in FIG. 1. The data generation circuit 17, the diagnostic circuit 19, the monitoring part 151, and the information rewriting part 153 may be realized by a micro processing unit (MPU), for example, executing commands of a program that is software for realizing each component using information stored in a memory.

The monitoring part 151 can monitor reception of an optical signal performed by the light receiving part 130. The monitoring part 151 may perform the monitoring only during a preset monitoring time or may continue the monitoring until the light receiving part 130 receives an optical signal. The monitoring part 151 can transmit the monitoring result to the superposed signal transmission part 155.

The information rewriting part 153 can rewrite the information stored in the information storage part 140 on the basis of an instruction input from the outside. In other words, the information rewriting part 153 can acquire prescribed information from the optical signal received by the light receiving part 130 and cause the information storage part 140 to store the prescribed information. The information rewriting part 153 may overwrite the prescribed information in the information storage part 140 or may accumulate the prescribed information as history information in the information storage part 140, in accordance with the type of the information.

The superposed signal transmission part 155 can generate a superposed signal by superposing the operation signal output from the operation element 13 of the electric apparatus 6 with transmission data (a data signal) generated by the data generation circuit 17 using the superposing circuit 18 and transmit the superposed signal to the input unit 4. Specifically, the superposed signal transmission part 155 can create the superposed signal by superposing the operation signal received from the electric apparatus 6 through the electric-apparatus-side terminal 110 with the data signal generated from the prescribed information stored in the information storage part 140. The superposed signal transmission part 155 can transmit the generated superposed signal to the input unit 4 via the communication-device-side terminal 120.

The information rewriting device 200 can be communicably connected to the signal processing device 100 and an input terminal 300, which will be described later. The information rewriting device 200 can acquire prescribed information regarding the electric apparatus 6 from the input terminal 300. The information rewriting device 200 can project light for the acquired prescribed information as an optical signal to the signal processing device 100. The information rewriting device 200 can receive the superposed signal from the signal processing device 100 through the communication-device-side terminal 120 and inspect whether or not the prescribed information indicated by the data signal included in the superposed signal conforms to the content projected as the optical signal by the information rewriting device itself. Also, the information rewriting device 200 may output the inspection result to a display part, which is not illustrated, or may output the inspection result to an external apparatus including the input terminal 300. The information rewriting device 200 includes a light projecting part 210 and a rewriting circuit 220, and the rewriting circuit 220 includes an information acquisition part 221 and an information inspection part 223.

The light projecting part 210 can project prescribed information input from the information acquisition part 221 as an optical signal. The light projecting part 210 may be, for example, a light emitting diode (LED) (the LED in FIG. 5) and may project the optical signal toward the light receiving part 130 of the signal processing device 100 using an optical cable or the like. The optical signal may represent the prescribed information by changing a projection pattern, for example. Specifically, the light projecting part 210 may provide a notification of the prescribed information using a change in light color, a blinking pattern, and light intensity. The light projecting part 210 may further project optical signals indicating a start of rewriting and an end of the rewriting before and after the optical signal in accordance with the information to be rewritten is projected.

The rewriting circuit 220 can execute various functions for rewriting the prescribed information regarding the electric apparatus 6 stored in the information storage part 140 of the signal processing device 100. The rewriting circuit 220 can receive the superposed signal from the signal processing device 100 through the communication-device-side terminal 120 and inspect the superposed signal.

The information acquisition part 221 can acquire information to be rewritten from the input terminal 300. The information acquisition part 221 inputs the acquired information to the light projecting part 210.

The information inspection part 223 can extract the data signal from the superposed signal received from the signal processing device 100 and inspect whether or not the prescribed information regarding the electric apparatus 6 indicated by the data signal conforms to the content projected as the optical signal by the light projecting part 210. Specifically, the information inspection part 223 executes two operations, namely inspection regarding whether or not rewriting on the information storage part 140 has been performed by the signal processing device 100 and inspection regarding whether or not the rewritten prescribed information conforms to the projected content.

The input terminal 300 is communicably connected to the information rewriting device 200 and can input the prescribed information regarding the electric apparatus 6, which the information storage part 140 of the signal processing device 100 is caused to store, to the information rewriting device 200. The input terminal 300 may be, for example, a smartphone, and a user of the input terminal 300 may input prescribed information through a touch operation or the like. At this time, the information rewriting device 200 may be an adaptor that is connectable with the smartphone and is provided with a dedicated light source operating as the light projecting part 210. For example, the information rewriting device 200 may be connected to the smartphone via a Universal Serial Bus (USB). Alternatively, the input terminal 300 may be configured integrally with the information rewriting device 200. In a case in which the input terminal 300 is a smartphone, the smartphone may use a display or an illumination LED as the light projecting part 210.

Also, the prescribed information regarding the electric apparatus 6 may be input to the input terminal 300 by a method other than the manual operation. In a case in which ID information or the like of the electric apparatus 6 is provided as a two-dimensional code at a part of the casing of the electric apparatus 6, for example, the input terminal 300 may read and acquire the two-dimensional code using a camera or the like.

(Circuit Configurations of Signal Processing Device and Information Rewriting Device)

Figure 5:
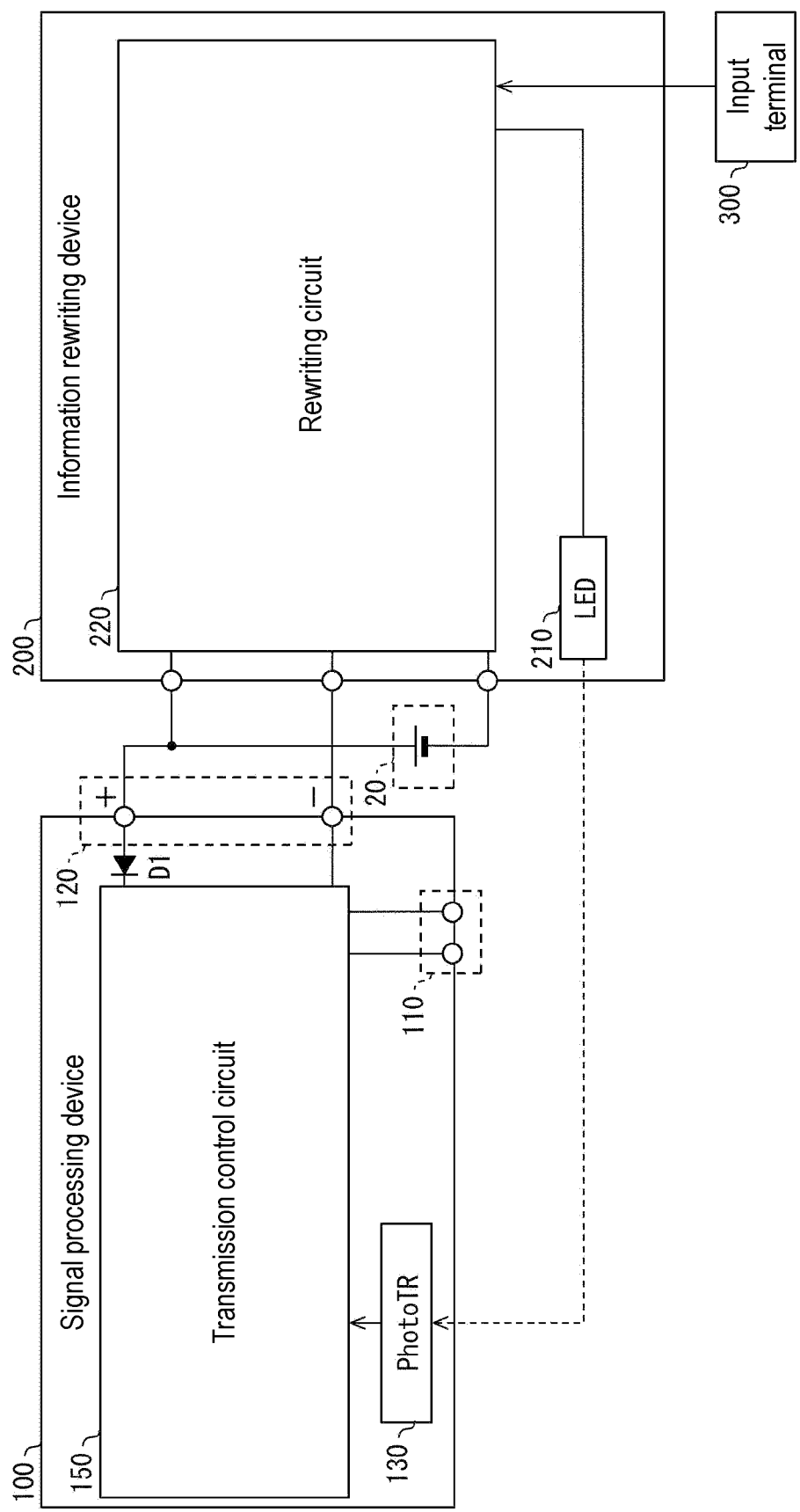
FIG. 5 is a circuit diagram illustrating configurations of the signal processing device and the information rewriting device.

FIG. 5 is a circuit diagram illustrating configurations of the signal processing device 100 and the information rewriting device 200 according to an aspect of the present disclosure. Although some blocks that have already been described using FIGS. 1 and 2 are omitted in FIG. 5, it is assumed that the blocks are also included in the signal processing device 100 or the information rewriting device 200 as illustrated in FIGS. 1 and 2.

In the signal processing device 100, each of the electric-apparatus-side terminal 110 and the communication-device-side terminal 120 includes two paths. A current supplied from the power source 20 is input to a + terminal side of the communication-device-side terminal 120, and the current is input to the transmission control circuit 150 through a diode D1. In other words, the signal processing device 100 drives the transmission control circuit 150 and the like using the current supplied from the power source 20.

The light receiving part 130 illustrated as "PhotoTR" in the drawing receives an optical signal in accordance with the path illustrated as a dashed line from the light projecting part 210 illustrated as an "LED" in the information rewriting device 200 and inputs an electrical signal obtained by converting the optical signal to the transmission control circuit 150.

The transmission control circuit 150 transmits and receives currents and signals using the electric-apparatus-side terminal 110 and the communication-device-side terminal 120. Specifically, the transmission control circuit 150 receives an output signal in accordance with the state of the operation element 13 of the electric apparatus 6 from the electric apparatus 6, which is not illustrated, through the electric-apparatus-side terminal 110, superposes the prescribed information stored in the information storage part 140 with the output signal, and thereby generates a superposed signal. Moreover, the transmission control circuit 150 transmits the generated superposed signal to the rewriting circuit 220 of the information rewriting device 200 through the communication-device-side terminal 120.

The transmission control circuit 150 can rewrite the prescribed information stored in the information storage part 140 with the content input from the light projecting part 210 by causing the light receiving part 130 and the light projecting part 210 to have the circuit configurations described above. Also, the transmission control circuit 150 can transmit, to the rewriting circuit 220, the superposed signal obtained by superposing various kinds of information stored in the information storage part 140 including the rewritten content and the like with the output signal. In this manner, the information rewriting device 200 can inspect whether or not the prescribed information included in the superposed signal received by the rewriting circuit 220 conforms to the content projected from the light projecting part 210.

(Specific Examples of Rewriting and Inspection of Information)

Figure 6:
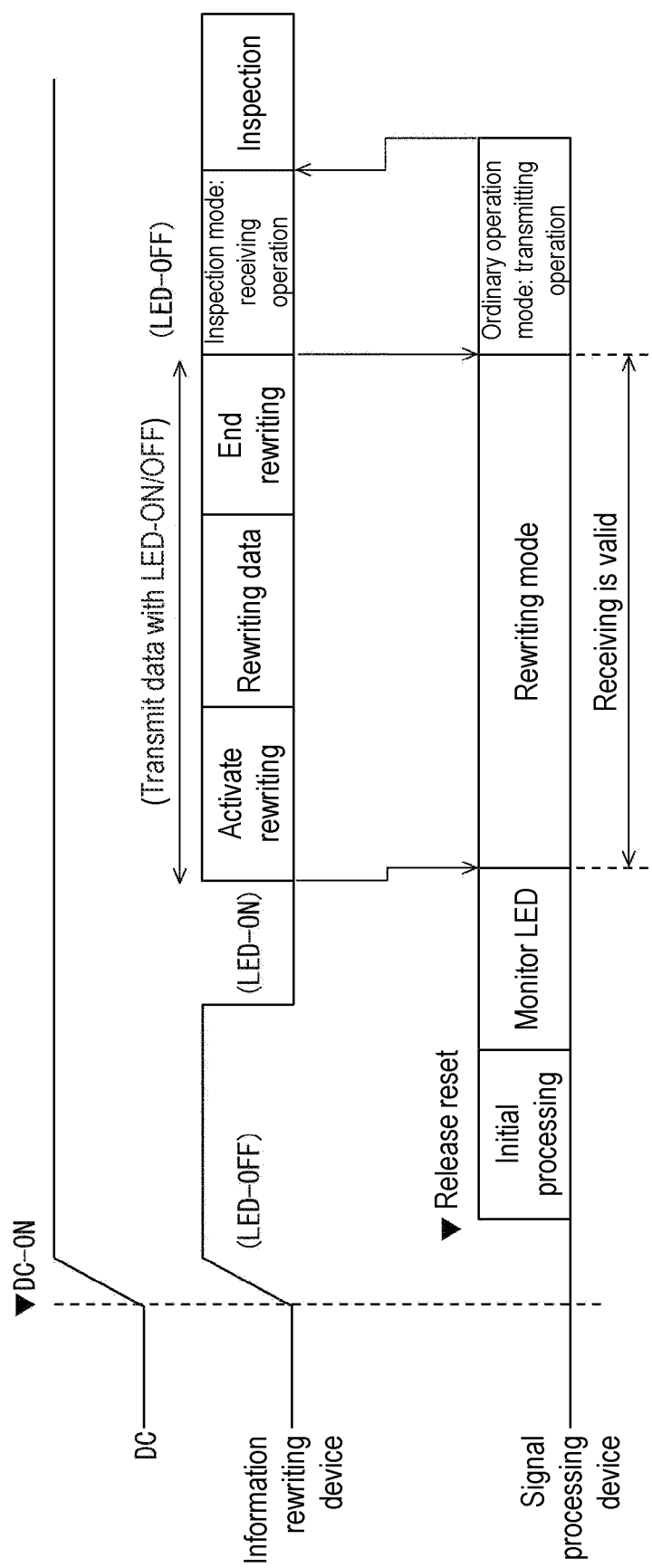
FIG. 6 is a diagram illustrating specific examples of rewriting and inspection of information using the signal processing device and the information rewriting device according to an aspect of the present disclosure.

FIG. 6 is a diagram illustrating specific examples of rewriting and inspection of information using the signal processing device 100 and the information rewriting device 200 according to an aspect of the present disclosure. In the following description, it is assumed that information to be rewritten using the input terminal 300 has been input to the information rewriting device 200 in advance.

In the illustrated example, "DC" represents a DC current supplied from the power source 20, and "DC-ON" represents a timing at which the power source 20 is activated. "(LED-ON)" and "(LED-OFF)" represent whether or not light has been projected by the light projecting part 210. "Activate rewriting," "rewriting data," and "end rewriting" correspond to "a projection pattern corresponding to a rewriting start instruction indicating a start of rewriting," "a projection pattern in accordance with rewriting data that is content to be rewritten," and "a projection pattern corresponding to a rewriting end instruction indicating an end of rewriting," respectively. Also, "inspection mode: receiving operation" is an operation mode for receiving a superposed signal transmitted from the signal processing device 100, and "inspection" is an operation mode for inspecting prescribed information indicated by the data signal included in the received superposed signal.

Each of "monitor LED," "rewriting mode," and "ordinary operation mode: transmitting operation" represents an operation mode of the signal processing device 100. "Monitor LED" indicates that the monitoring part 151 in the signal processing device 100 is monitoring reception of an optical signal by the light receiving part 130, and "rewriting mode" indicates that the information rewriting part 153 in the signal processing device 100 is in a state in which it can rewrite the content in the information storage part 140. "Ordinary operation mode: transmitting operation" indicates a state in which the signal processing device 100 is to generate a superposed signal by superposing a data signal indicating prescribed information with an output signal acquired from the electric apparatus 6 and transmit the superposed signal to the information rewriting device 200. In other words, in a case in which an optical signal is detected by the monitoring part 151, operation modes in which the superposed signal transmission part 155 does not transmit a superposed signal and the information rewriting part 153 rewrites the information stored in the information storage part 140 on the basis of the optical signal are "monitor LED" and "rewriting mode." Then, an operation mode in which the superposed signal transmission part 155 transmits a superposed signal after the rewriting processing is completed by the information rewriting part 153 is "ordinary operation mode: transmitting operation."

First, if the power source 20 is activated, then the transmission control circuit 150 of the signal processing device 100 releases its reset state, performs initial processing, and then starts to monitor light receiving performed by the light receiving part 130 of the monitoring part 151 in "monitor LED."

On the other hand, the information rewriting device 200 changes its state from "(LED-OFF)" to "(LED-ON)" asynchronously with the state of the signal processing device 100. The information rewriting device 200 then projects an optical signal in the order of "activate rewriting," "rewriting data," and "end rewriting" using the light projecting part 210. After a series of light projection is completed, the information rewriting device 200 causes the operation mode to be shifted to "ordinary operation mode: transmitting operation" and starts to receive a superposed signal.

The signal processing device 100 detects reception of the optical signal projected during the operation in "monitor LED" and then causes the operation mode to be shifted to "rewriting mode." The signal processing device 100 receives an optical signal with a projection pattern in accordance with "rewriting data" received after an optical signal with a projection pattern in accordance with "activate rewriting" is received during the operation in "rewriting mode" as information to be rewritten and rewrites the information storage part 140 using the information rewriting part 153. Thereafter, if an optical signal with a projection pattern in accordance with "end rewriting" is received, then "rewriting mode" is ended, and the operation mode is shifted to "ordinary operation mode: transmitting operation." The signal processing device 100 generates a data signal using the rewritten prescribed information stored in the information storage part 140 and transmits a superposed signal including the data signal to the information rewriting device 200 using the superposed signal transmission part 155.

The information rewriting device 200 receives the superposed signal from the signal processing device 100 during the operation in "ordinary operation mode: transmitting operation," then causes its operation mode to be shifted to "inspection," and performs inspection on the prescribed information indicated by the data signal included in the superposed signal using the information inspection part 223.

In this manner, the prescribed information regarding the electric apparatus 6 stored in the signal processing device 100 is rewritten using the information rewriting device 200. Therefore, the user can rewrite the prescribed information even after the signal processing device 100 is manufactured or shipped. Therefore, the signal processing device 100 can transmit a superposed signal obtained by superposing the rewritten prescribed information with the output signal received from the electric apparatus 6 to the input unit 4. It is thus possible to realize transmission of the superposed signal by using the signal processing device 100 even in a case in which the electric apparatus 6 is not compatible with the transmission of superposed signals, for example.

Although the signal processing device 100 causes its operation mode to be shifted to "rewriting mode" on the basis of the optical signal including the rewriting activation instruction in the description of FIG. 6, the trigger to shift to "rewriting mode" is not limited thereto. The signal processing device 100 may be triggered by the light receiving part 130 receiving some light after the device is activated and shift to "rewriting mode" or may shift to "rewriting mode" on the basis of an input from an external apparatus, for example.

Although the signal processing device 100 is assumed to be a device that is different from the electric apparatus 6 in the description of FIG. 1, the signal processing device 100 may be configured integrally with the electric apparatus 6. For example, the configuration of the signal processing device 100 may be incorporated in the electric apparatus 6.

§ 3 Operation Example (Processing Flow)

Figure 7:
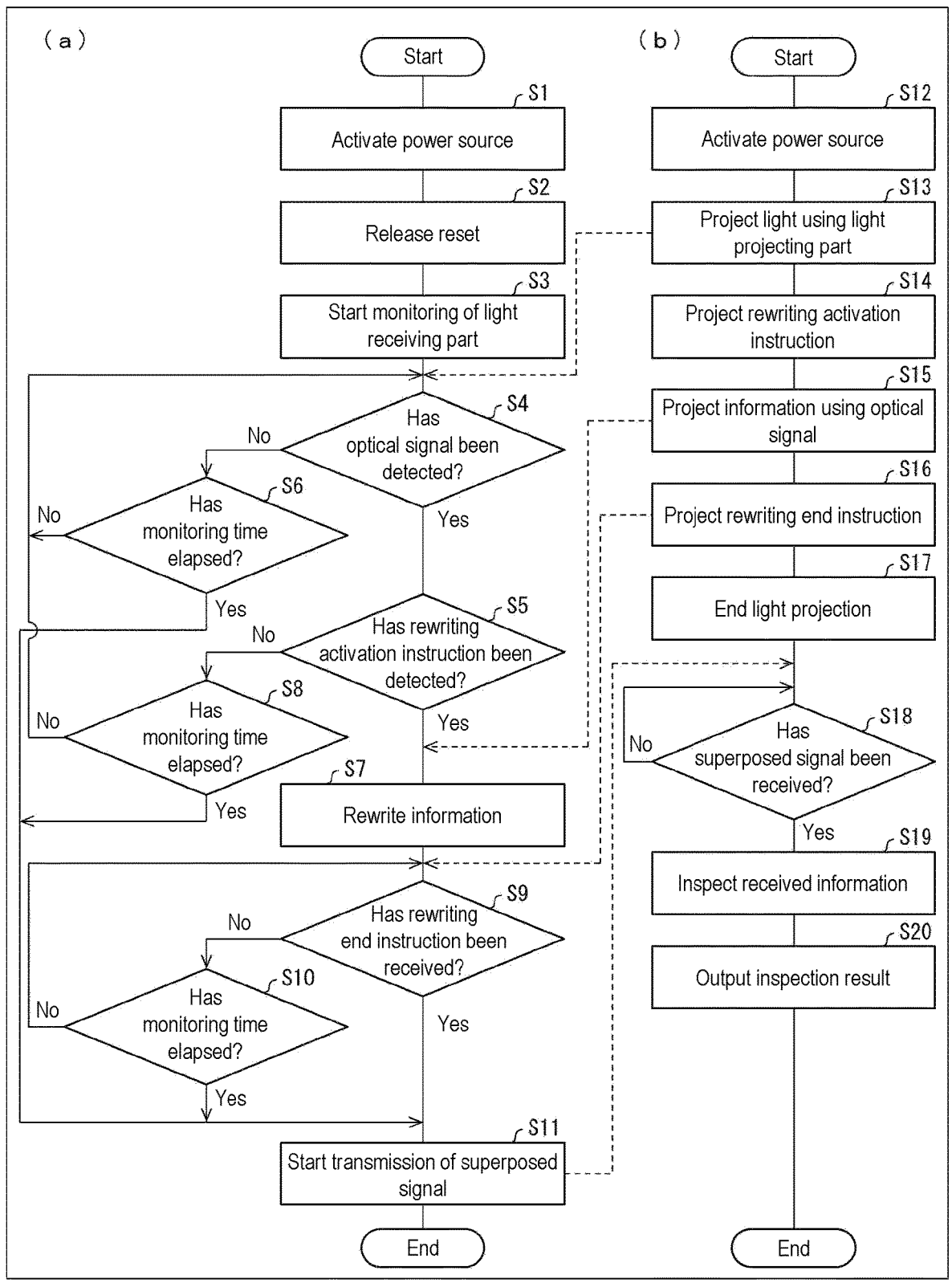
FIG. 7 is a flowchart illustrating an example of a processing flow executed by the signal processing device and the information rewriting device according to an aspect of the present disclosure, where (a) illustrates a flow of the signal processing device 100 and (b) illustrates a flow of the information rewriting device.

Each diagram in FIG. 7 is a flowchart illustrating an example of a processing flow executed by the signal processing device 100 and the information rewriting device 200 according to an aspect of the present disclosure. (a) of FIG. 7 illustrates a flow of the signal processing device 100, and (b) of FIG. 7 illustrates a flow of the information rewriting device 200. In the following description, it is assumed that the signal processing device 100 and the information rewriting device 200 are connected to the power source 20 similarly to FIG. 5 and information to be rewritten has already been input to the information rewriting device 200 in advance using the input terminal 300.

First, the flow of the signal processing device 100 will be described using (a) of FIG. 7. First, if the power source 20 is activated through a user's operation or the like, power supply to the signal processing device 100 is started (S1). If the power supply is started, then the signal processing device 100 releases its reset state after S1 (S2). After the reset state is released, the signal processing device 100 executes initialization processing, and after the initialization processing is completed, the monitoring part 151 starts to monitor light reception performed by the light receiving part 130 (S3).

After S3, the monitoring part 151 determines whether or not the light receiving part 130 has detected an optical signal projected from the light projecting part 210 (S4). If the optical signal is projected from the light projecting part 210 through processing in S12, which will be described later, then the light receiving part 130 receives the optical signal. In a case in which the monitoring part 151 determines that the projected optical signal has been detected (YES in S4), the monitoring part 151 further determines whether or not the light receiving part 130 has received a rewriting activation instruction as an optical signal (S5). On the other hand, in a case in which it is determined that the optical signal has not been detected in S4 (NO in S4), the monitoring part 151 determines whether or not a preset monitoring time has elapsed (S6).

In a case where it is determined that the rewriting activation instruction projected from the light projecting part 210 through processing in S14, which will be described later, has been received in S5 (YES in S5), the processing proceeds to S7. In S7, the information rewriting part 153 rewrites the prescribed information regarding the electric apparatus 6 stored in the information storage part 140 on the basis of the optical signal projected from the light projecting part 210 through processing in S15, which will be described later (S7). On the other hand, in a case in which it is determined that the rewriting activation instruction has not been received, the processing proceeds to S8.

In a case in which it is determined that the monitoring time has not elapsed in S6 (NO in S6), the processing proceeds to S4, and the processing in S4 to S6 is executed again. On the other hand, in a case in which it is determined that the monitoring time has elapsed (YES in S6), the processing proceeds to S11. In a case in which it is determined that the monitoring time has not elapsed in S8 (NO in S8), the processing proceeds to S4, and the processing in S4 to S8 is executed again similarly to S6. On the other hand, in a case in which it is determined that the monitoring time has elapsed (YES in S8), the processing proceeds to S11.

In S9, the monitoring part 151 determines whether or not an optical signal indicating a rewriting end instruction projected from the light projecting part 210 through processing in S16, which will be described later (S9). In a case in which it is determined that the optical signal has not been received (NO in S9), the monitoring part 151 determines whether or not a preset monitoring time has elapsed (S10). In a case in which it is determined that the monitoring time has not elapsed (NO in S10), the processing proceeds to S9, and the processing in S9 is executed again. On the other hand, in a case in which it is determined that the monitoring time has elapsed (YES in S10), the signal processing device 100 receives reception of the rewriting instruction regarding the prescribed information, and the processing proceeds to S11.

In S11, the signal processing device 100 starts to transmit a superposed signal using the superposed signal transmission part 155 (S11). The prescribed information indicated by the data signal included in the superposed signal transmitted in S11 is content before rewriting when the processing proceeds from S6 to S11, and the prescribed information is content after the rewriting in S7 when the processing proceeds from S9 or S10 to S11.

Through the above processing, the signal processing device 100 according to an aspect of the present disclosure can transmit the superposed signal obtained by superposing the prescribed information with the operation signal to the communication device. Also, it is possible to rewrite the prescribed information included in the content transmitted as the superposed signal on the basis of the optical signal. Therefore, the user can rewrite the prescribed information even after the signal processing device 100 is manufactured or shipped. Moreover, it is possible to realize the transmission of the superposed signal by using the signal processing device 100 even when the external electric apparatus 6 is a superposed-signal-communication-incompatible apparatus that is not compatible with transmission of superposed signals.

Next, the flow of the information rewriting device 200 will be described using (b) of FIG. 7. First, if the power source 20 is activated through a user's operation or the like, power supply to the information rewriting device 200 is started (S12). If the power source 20 has already been activated through the aforementioned processing in S1, the activation of the power source 20 is omitted in S12, and the power supply to the information rewriting device 200 has already been started. Thereafter, the information rewriting device 200 starts to project light using the light projecting part 210 (S13).

After S13, the information rewriting device 200 projects the rewriting activation instruction as an optical signal using the light projecting part 210 (S14). Thereafter, the information rewriting device 200 projects information that has been input from the input terminal 300 and has been acquired by the information acquisition part 221 as an optical signal using the light projecting part 210 (S15). If the light projecting part 210 ends the projection of the prescribed information as the optical signal, then the information rewriting device 200 projects an optical signal indicating the rewriting end instruction using the light projecting part 210 (S16), and the series of light projection is ended (S17).

After S17, the rewriting circuit 220 of the information rewriting device 200 determines whether or not the superposed signal transmitted by the signal processing device 100 through the aforementioned processing in S11 has been received (S18). In a case in which it is determined that the superposed signal has been received (YES in S18), the information inspection part 223 inspects whether or not the prescribed information indicated by the data signal extracted from the superposed signal conforms to the content projected by the light projecting part 210 as the optical signal in S14 (S19). The information rewriting device 200 outputs the inspection result in S19 to the display device or an external apparatus, which is not illustrated (S20).

Through the aforementioned processing, the information rewriting device 200 according to an aspect of the present disclosure can rewrite the information stored in the information storage part 140 in the signal processing device 100 with the optical signal. Then, the information rewriting device 200 can inspect whether or not the information has accurately been rewritten on the basis of the superposed signal received from the signal processing device 100.

§ 4 First Modification Example

In the aforementioned configuration example, the signal processing device 100 is configured to start to transmit the superposed signal after the information stored in the information storage part 140 is rewritten. However, the signal processing device 100 may be configured to rewrite the information during transmission of the superposed signal, for example.

(Configurations of Signal Processing Device and Information Rewriting Device)

The signal processing device 100 and the information rewriting device 200 according to an aspect of the present disclosure will be described using FIG. 1. The information rewriting device 200 is the same as the information rewriting device 200 in the aforementioned configuration example.

Although a basic configuration of the signal processing device 100 is the same as that in the aforementioned configuration example, a part of the configuration thereof is different. In the modification example, the superposed signal transmission part 155 is different in that the superposed signal transmission part 155 transmits a superposed signal even when the monitoring part 151 monitors the light reception performed by the light receiving part 130 and stops the transmission of the superposed signal at the timing when the light receiving part 130 detects an optical signal.

(Specific Examples of Rewriting and Inspection of Information)

Figure 8:
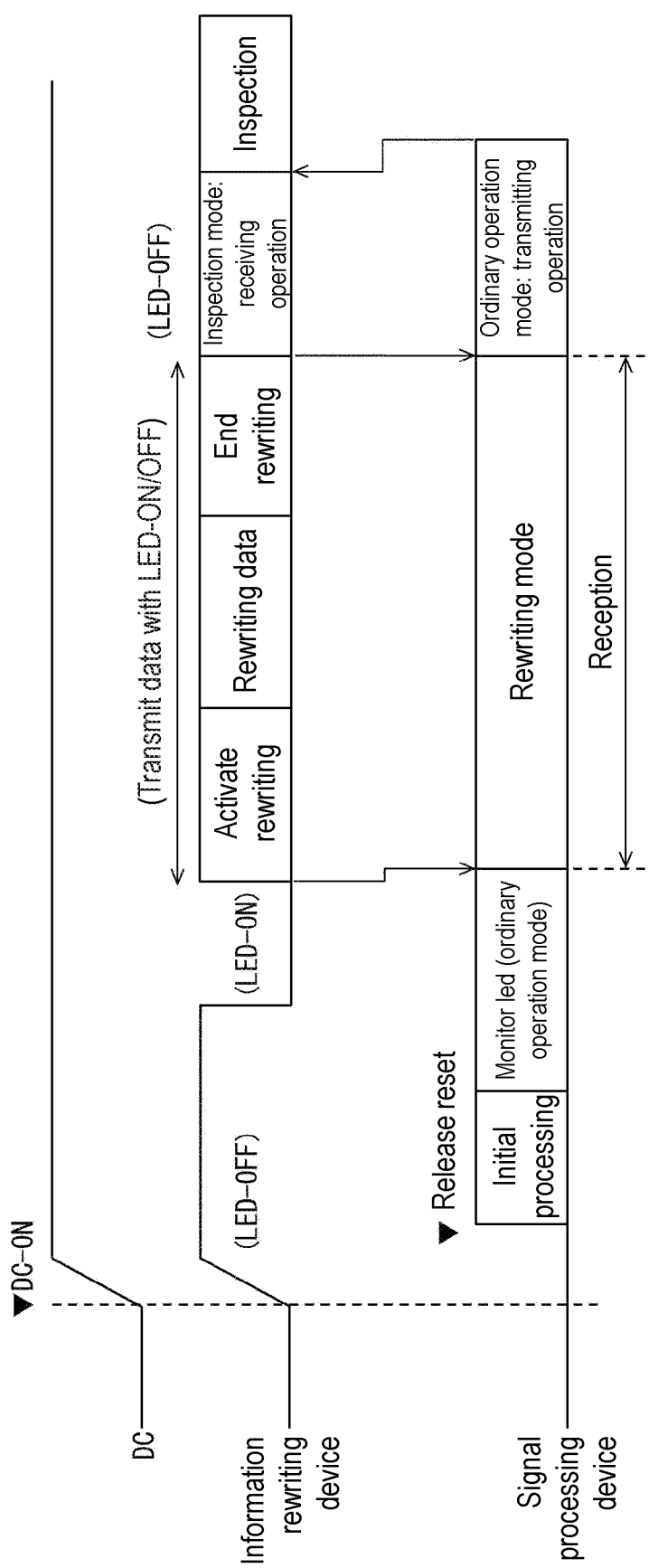
FIG. 8 is a diagram illustrating specific examples of rewriting and inspection of information using the signal processing device and the information rewriting device during transmission of a superposed signal.

FIG. 8 is a diagram illustrating specific examples of rewriting and inspection of information using the signal processing device 100 and the information rewriting device 200 during transmission of a superposed signal. In the following description, it is assumed that information to be rewritten has already been input to the information rewriting device 200 in advance using the input terminal 300, and description of items with the same names as those in FIG. 6 will be omitted. Also, since operations of the information rewriting device 200 are the same as those in FIG. 6, description thereof will be omitted.

First, if the power source 20 is activated, then the transmission control circuit 150 of the signal processing device 100 releases its reset state, performs initial processing, and then operates in "monitor LED (ordinary operation mode)." Here, "monitor LED (ordinary operation mode)" is an operation mode in which monitoring of light reception of the light receiving part 130 performed by the monitoring part 151 and transmission of the superposed signal performed by the superposed signal transmission part 155 are performed together.

If the signal processing device 100 detects light reception of the optical signal during the operation in "monitor LED (ordinary operation mode)," then the signal processing device 100 stops the transmission of the superposed signal and causes the operation mode to be shifted to "rewriting mode." The signal processing device 100 rewrites information on the basis of the optical signal received from the light projecting part 210 of the information rewriting device 200 as described above using FIG. 6, then ends "rewriting mode," and causes the operation mode to be shifted to "ordinary operation mode: transmitting operation." The operations of the signal processing device 100 in "ordinary operation mode: transmitting operation" are the same as the content described above using FIG. 6. In this manner, the signal processing device 100 can rewrite the information using the information rewriting device 200 even after the transmission of the superposed signal is started.

(Processing Flow)

Figure 9:
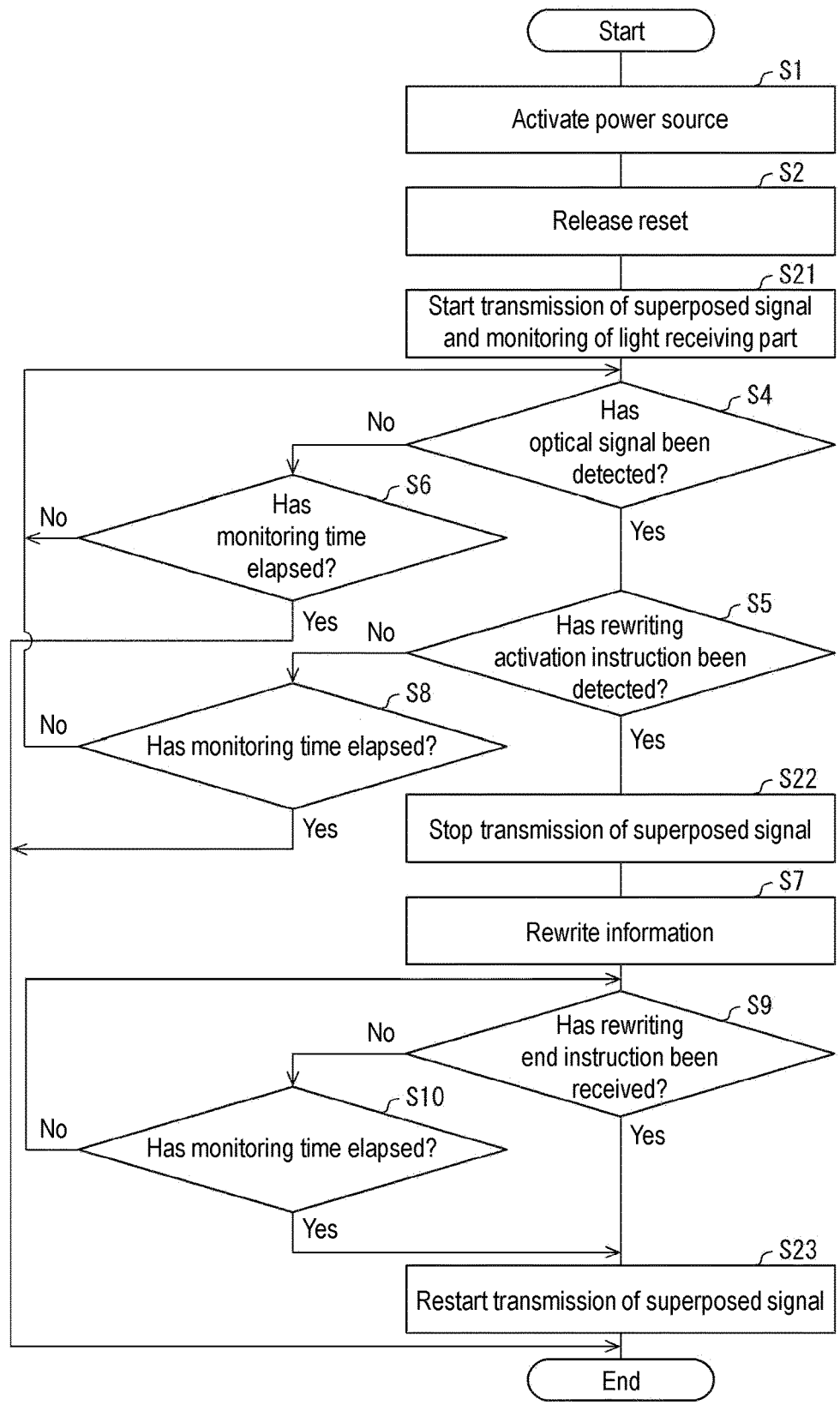
FIG. 9 is a flowchart illustrating an example of a processing flow executed by the signal processing device according to an aspect of the present disclosure.

FIG. 9 is a flowchart illustrating an example of a processing flow executed by the signal processing device 100 according to an aspect of the present disclosure. In the following description, description of the same processing as that in (a) of FIG. 7 will be omitted. Also, the flow of the information rewriting device 200 is completely the same as that in (b) of FIG. 7.

The signal processing device 100 starts to transmit the superposed signal using the superposed signal transmission part 155 and monitor the light receiving part 130 using the monitoring part 151 (S21) after the processing in S1 and S2 is executed. After S21, the signal processing device 100 executes the processing in S4 to S6 similarly to the operation example. The processing here is different from that in (a) of FIG. 7 in that the series of processing is ended in a case in which the monitoring part 151 determines that the preset monitoring time has elapsed in S6 (YES in S6) since the superposed signal transmission part 155 has already started the transmission of the superposed signal in S21.

In a case in which it is determined that the rewriting activation instruction has been determined in S5 (YES in S5), the superposed signal transmission part 155 stops the transmission of the superposed signal (S22). The processing then proceeds to S7. On the other hand, in a case in which it is determined that the rewriting activation instruction has not been received (NO in S5), the processing proceeds to S8, and whether or not the monitoring time in response to the rewriting activation instruction has elapsed is determined (S8). The processing here is different from that in (a) of FIG. 7 in that the series of processing is ended in a case in which the monitoring part 151 determines that the preset monitoring time has elapsed in S8 (YES in S8) since the superposed signal transmission part 155 has started the transmission of the superposed signal in S21.

After S7, the signal processing device 100 executes the processing in S9 and S10 similarly to the aforementioned operation example. Then, in a case in which it is determined that the rewriting end instruction has been received in S9 (YES in S9) or in a case in which it is determined that the monitoring time has elapsed in S10 (YES in S10), the superposed signal transmission part 155 restarts the transmission of the superposed signal (S23). Thereafter, the signal processing device 100 ends the series of processing.

Through the aforementioned processing, the signal processing device 100 can transmit the superposed signal generated by rewriting information on the basis of the optical signal and using the rewritten information even after the transmission of the superposed signal is started.

Second Embodiment

Another embodiment according to an aspect of the present disclosure will be described below. For convenience of explanation, the same reference signs will be applied to members having the same functions as those of the members described in the first embodiment, and the description thereof will not be repeated.

§ 1 Application Example

Figure 10:
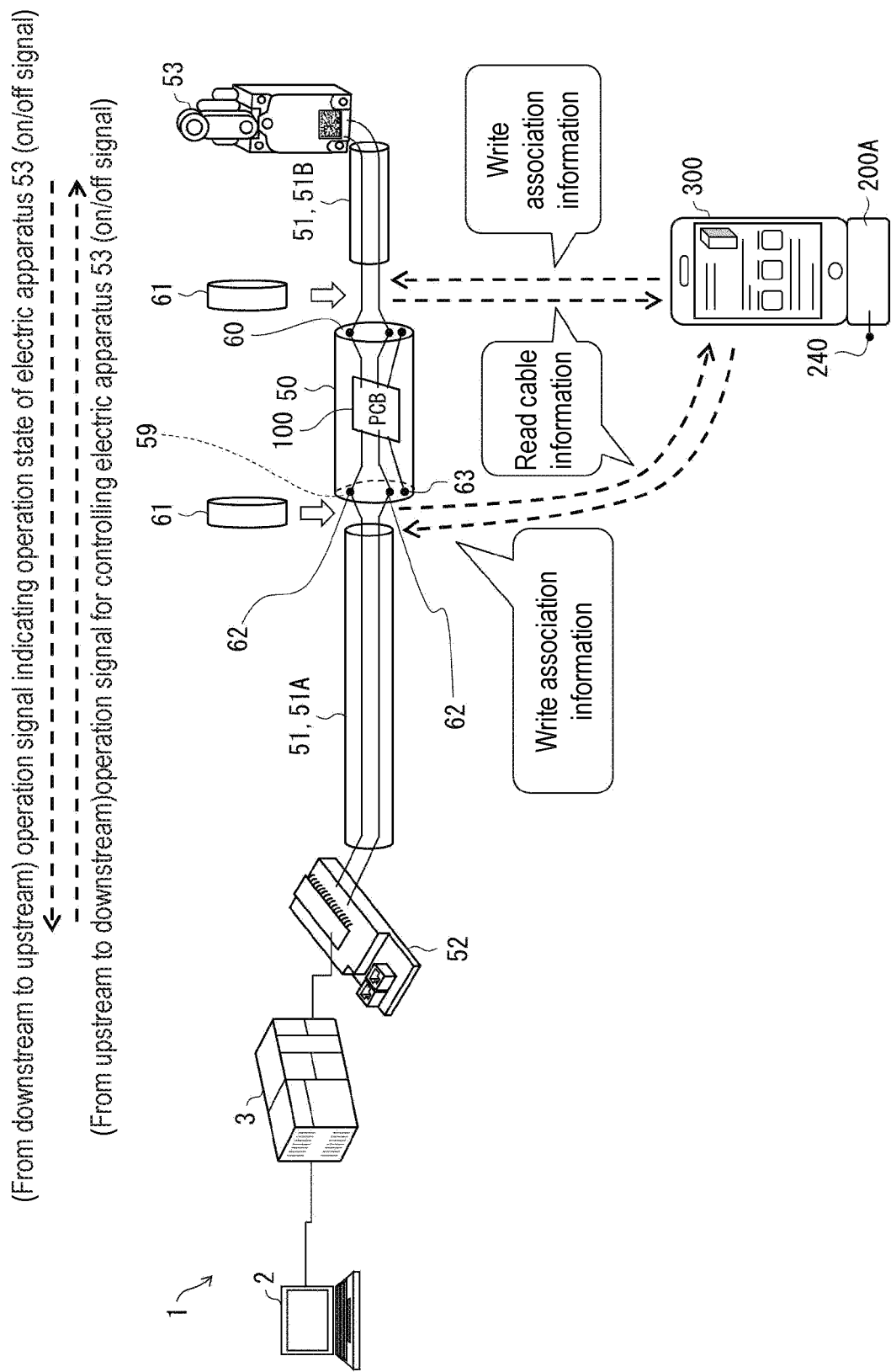
FIG. 10 is a diagram schematically exemplifying an example of an application situation of the signal processing device according to an aspect of the present disclosure.

FIG. 10 is an example schematically exemplifying an example of an application situation of a signal processing device 100 according to the present embodiment. A communication system 1 includes a personal computer 2 (a PC or an information processing device), a controller 3 (external device, apparatus control device), an input unit 4, an output unit 5, and electric apparatuses 6 to 10 similarly to the first embodiment.

In the present embodiment, the input unit 4 and the output unit 5 will be collectively referred to as an input/output unit 52 (external device, apparatus control device) as a component conceptually including them in a case in which it is not necessary to distinguish the input unit 4 from the output unit 5. The input/output unit 52 is compatible with superposed signal communication similarly to the input unit 4 and the output unit 5. Therefore, the input/output unit 52 includes the components in FIG. 2 that the input unit 4 and the output unit 5 include to be compatible with the superposed signal communication.

In the present embodiment, in a case in which it is not necessary to individually identify the electric apparatuses 6 to 10, the electric apparatuses 6 to 10 will be simply referred to as an electric apparatus 53 (external device). The electric apparatus 53 may be a superposed-signal-communication-incompatible apparatus.

In the present embodiment, the controller 3 is connected to the input/output unit 52 and can control and monitor the electric apparatus 53 by receiving a signal regarding the electric apparatus 53 using the input/output unit 52. The controller 3 constitutes an apparatus control device that controls or monitors the electric apparatus 53 along with the input/output unit 52. In another example, the controller 3 may integrally include the input/output unit 52, and an apparatus control device may be configured with a single component.

In the present embodiment, the signal processing device 100 for processing superposed signals is provided between communication cables 51 connecting the input/output unit 52 to the electric apparatus 53. Therefore, the signal processing device 100 has a cable casing 50 with an outer shape like a communication cable that can be electrically connected to the communication cables 51 in one example. Here, in regard to the communication cable 51, the communication cable 51 connected to an apparatus (the electric apparatus 53, for example) on the downstream side of the signal processing device 100 will be referred to as a communication cable 51B and will be distinguished from a communication cable 51A connected to a device (the input/output unit 52, for example) on the upstream side of the signal processing device 100 as needed.

For example, one end (specifically, a downstream-side end portion 60) of the cable casing 50 can be attached to and detached from the communication cable 51B connected to the electric apparatus 53 that is a superposed-signal-communication-incompatible apparatus. The signal processing device 100 and the electric apparatus 53 are electrically connected by the communication cable 51B on the side of the electric apparatus 53 and the downstream-side end portion 60 (downstream-side surface) being connected to each other, such that operation signals can be transmitted and received between the signal processing device 100 and the electric apparatus 53. The signal processing device 100 incorporated in the cable casing 50 and the electric apparatus 53 are connected in a one-to-one relationship. In the present embodiment, the electric apparatus 53 is a superposed-signal-communication-incompatible apparatus, and it is thus assumed that superposed signals are not transmitted and received.

Also, the other end (specifically, an upstream-side end portion 59) of the cable casing 50 can be connected to the input/output unit 52. Specifically, the upstream-side end portion 59 (upstream-side surface) is configured to be able to be attached to and detached from the communication cable 51A connected to the input/output unit 52. When the communication cable 51A on the side of the input/output unit 52 and the upstream-side end portion 59 of the cable casing 50 are connected, the input/output unit 52 and the signal processing device 100 are electrically connected, and superposed signals can be transmitted and received between the input/output unit 52 and the signal processing device 100. A superposed signal transmitted from the input/output unit 52 to the signal processing device 100 includes an operation signal for controlling an operation element of the electric apparatus 53 connected to the signal processing device 100, for example. Also, a superposed signal transmitted from the signal processing device 100 to the input/output unit 52 includes an operation signal in accordance with a state of the operation element of the electric apparatus 53 connected to the signal processing device 100 and a data signal indicating prescribed information regarding the electric apparatus 53 or the signal processing device 100, for example. For example, information unique to the electric apparatus 53, such as a serial number of the electric apparatus 53, is included as the data signal.

According to the aforementioned configuration, the electric apparatus 53 is connected to the signal processing device 100 that is compatible with superposed signal communication in a one-to-one relationship and is connected to the input/output unit 52 via the signal processing device 100. Therefore, the input/output unit 52 can superpose the data signal unique to the electric apparatus 53 with the operation signal and exchange the superposed signal with the signal processing device 100 even if the electric apparatus 53 is a superposed-signal-communication-incompatible apparatus. Therefore, it is possible to incorporate and use the superposed-signal-communication-incompatible apparatus similarly to the electric apparatus that is compatible with superposed signal communication in a communication system using superposed signals. As a result, a degree of freedom in system construction is enhanced, and convenience is improved.

Incidentally, in the communication system 1 in which the input/output unit 52, the signal processing device 100, and the electric apparatus 53 are connected via the communication cable 51 and are caused to operate, it is necessary for the input terminal 300 to be connected to the signal processing device 100 via the information transfer device 200A (external device) and to read and write necessary data at the time of maintenance.

When the communication cable 51A in which disconnection has occurred is to be replaced, it is necessary for the input terminal 300 to read cable information for specifying the electric apparatus 53, with which communication cannot be performed any more due to the disconnection, from the signal processing device 100, and it is necessary for the input terminal 300 to write association information including a maintenance date on which replacement of the wire has been performed in the signal processing device 100. Alternatively, it is also necessary for the input terminal 300 to read the cable information corresponding to the electric apparatus 53 in which a failure has occurred from the signal processing device 100 and to write association information including apparatus information of the new replaced electric apparatus 53 in the signal processing device 100 similarly to the case where the electric apparatus 53 in which the failure has occurred is replaced.

In one example, in a case in which writing of information in the signal processing device 100 is realized by optical communication, providing of a window part that transmits light such that the light receiving part 130 can efficiently receive an optical signal in the casing that accommodates the signal processing device 100, for example, as in the first embodiment is conceivable. However, there is a probability that contamination adheres to the window part after utilization for years and the window part becomes more unlikely to transmit light since the casing incorporating the signal processing device 100 is installed at a manufacturing site. Alternatively, connection of the signal processing device 100 to the input terminal 300 using a signal line or the like instead of optical communication to electrically perform reading and writing of information is conceivable. However, if the input/output terminal for transmitting and receiving information to and from the input terminal 300 is exposed to the outside of the casing, there is a probability that the exposed input/output terminal is degraded due to contamination, corrosion, or the like similarly to the aforementioned window part.

In this manner, it is desirable to ensure that the input/output terminal of the signal processing device 100 be protected from external factors such as contamination and corrosion and information be accurately read and written between the input terminal 300 and the signal processing device 100. In particular, there is room for improvement in the configuration of the signal processing device 100 including the input/output terminal from the viewpoint that it is desired that the input/output terminal connected to the input terminal 300 is protected from external factors during an operation (when unnecessary) and connection to the input terminal 300 is easily achieved at the time of maintenance (when necessary).

Thus, the present embodiment is configured such that the casing that accommodates the signal processing device 100 and the communication cable 51 are connected via the connector member 61 when the signal processing device 100 is connected to the input/output unit 52 on the upstream side and to the electric apparatus 53 on the downstream side during an operation. Also, the information transmission terminal 63 that is connected to the information transfer device 200A of the input terminal 300 and enables the input terminal 300 to read and write information in the signal processing device 100 at the time of maintenance is provided at an end portion of the casing. Specifically, the information transmission terminal 63 is provided in an area inside the connector member 61 in a state in which the casing is connected to the communication cable 51 via the connector member 61. In one example, the information transmission terminal 63 is provided at the upstream-side end portion 59 of the cable casing 50 that is an area inside the connector member 61 by adhering to an end surface of the connector member 61 in a state in which the communication cable 51A is connected.

According to the aforementioned configuration, a surface of the upstream-side end portion 59 where the information transmission terminal 63 is provided is covered through adhesion to the end surface of the connector member 61 during an operation, that is, when the casing that accommodates the signal processing device 100 is connected to the communication cable 51 via the connector member 61. Therefore, the information transmission terminal 63 is protected from external factors, representative examples of which include contamination such as dust and oil, during the operation.

For example, the information transmission terminal 63 may be provided at the downstream-side end portion 60 that is an area inside the connector member 61 in a state in which the electric apparatus 53 (communication cable 51B) is connected via the connector member 61. Moreover, the information transmission terminal 63 may be provided at both the upstream-side end portion 59 and the downstream-side end portion 60.

Also, the information transmission terminal 63 is provided separately from the signal transmission terminal 62 for transmitting and receiving an operation signal regarding the electric apparatus 53 or a superposed signal including the operation signal to and from the external device during the operation, for example. In addition, the information transmission terminal 63 is provided at the upstream-side end portion 59 or the downstream-side end portion 60 that is inside the connector member 61 in a state in which the signal processing device 100 is connected to the external device via the connector member 61 similarly to the signal transmission terminal 62.

It is possible to protect the information transmission terminal 63 similarly to the signal transmission terminal 62 both during the operation and at the time of maintenance without making the shapes of the connector member 61 and the casing complicated, by providing the information transmission terminal 63 in the same surface as that of the signal transmission terminal 62. Also, since the information transmission terminal 63 is exposed to be connectable with the external device when the connector member 61 is detached to replace the communication cable 51A or the electric apparatus 53 at the time of maintenance, the re-attachment of the input terminal 300 to the information rewriting device 200 is easily and directly performed when the replacement is performed.

In the present embodiment, the casing that accommodates the signal processing device 100 is the cable casing 50 as illustrated in FIG. 10, and the cable casing 50 includes the upstream-side end portion 59 for connection to the communication cable 51A to which the input/output unit 52 is connected and the downstream-side end portion 60 for connection to the communication cable 51B to which the electric apparatus 53 is connected in one example.

For communication with the electric apparatus 53 that is not compatible with superposed signal communication, it is necessary to register the correspondence between the signal processing device 100 and the electric apparatus 53 in each device on the upstream side in the communication system 1 that employs the signal processing device 100 accommodated in the cable casing 50 described above. Therefore, it is necessary for the input terminal 300 to read cable information for uniquely identifying the signal processing device 100 from the signal processing device 100 and to write association information indicating the correspondence between the electric apparatus 53 and the signal processing device 100 in the signal processing device 100 at the time of maintenance when the electric apparatus 53 is newly installed or replaced or when the communication cable 51A is replaced.

Here, since there is a case in which it is necessary to perform an operation of attaching and detaching one end portion of the cable casing 50 merely for reading and writing information at the time of maintenance in the configuration in which the information transmission terminal 63 is provided only at one end portion of the cable casing 50, there is room for improvement.

Specifically, in a case in which the information transmission terminal 63 is provided only at the upstream-side end portion 59, it is originally necessary to perform an operation of detaching and attaching the upstream-side end portion 59 and the communication cable 51A when the communication cable 51A is replaced, and it is thus only necessary to replace the input terminal 300 (information transfer device 200A) when the communication cable 51A is detached from the upstream-side end portion 59 to replace the communication cable 51A and to read and write information. However, it is also necessary to perform an operation of detaching the communication cable 51A from the upstream-side end portion 59 for reading and writing information in addition to the operation of detaching the communication cable 51B connected to the electric apparatus 53 from the downstream-side end portion 60 for replacement when the electric apparatus 53 is replaced. The cable casing 50 is preferably configured such that information can be read and written both from the upstream-side end portion 59 and from the downstream-side end portion 60.

Thus, the present embodiment employs a configuration in which the information transmission terminals 63 are provided both at the upstream-side end portion 59 and at the downstream-side end portion 60 of the cable casing 50.

With the aforementioned configuration, it is possible to connect the information transfer device 200A to the information transmission terminal 63 of the upstream-side end portion 59 and to read and write information when the communication cable 51A that is a target of replacement is detached from the upstream-side end portion 59. On the other hand, it is possible to connect the information transfer device 200A to the information transmission terminal 63 of the downstream-side end portion 60 and to read and write information when the electric apparatus 53 (communication cable 51B) that is a target of replacement is detached from the downstream-side end portion 60.

In other words, it is possible to connect the information transfer device 200A to the signal processing device 100 both from the upstream side and from the downstream side of the cable casing 50 and to read and write information. As a result, there is no need to separately perform the detaching and attaching operation merely for reading and writing information both when the communication cable 51A is replaced and when the electric apparatus 53 is replaced, and convenience when the maintenance is performs is improved.

Hereinafter, five examples of the configurations of the cable casing 50 and the signal processing device 100 with the information transmission terminals 63 provided at both ends on the upstream side and the downstream side will be described as configuration examples (1) to (5). Before each configuration example is described, a configuration of each device common to the five configuration examples will be described first with reference to FIG. 11.

§ 2 Common Configuration

[Hardware Configuration]

Figure 11:
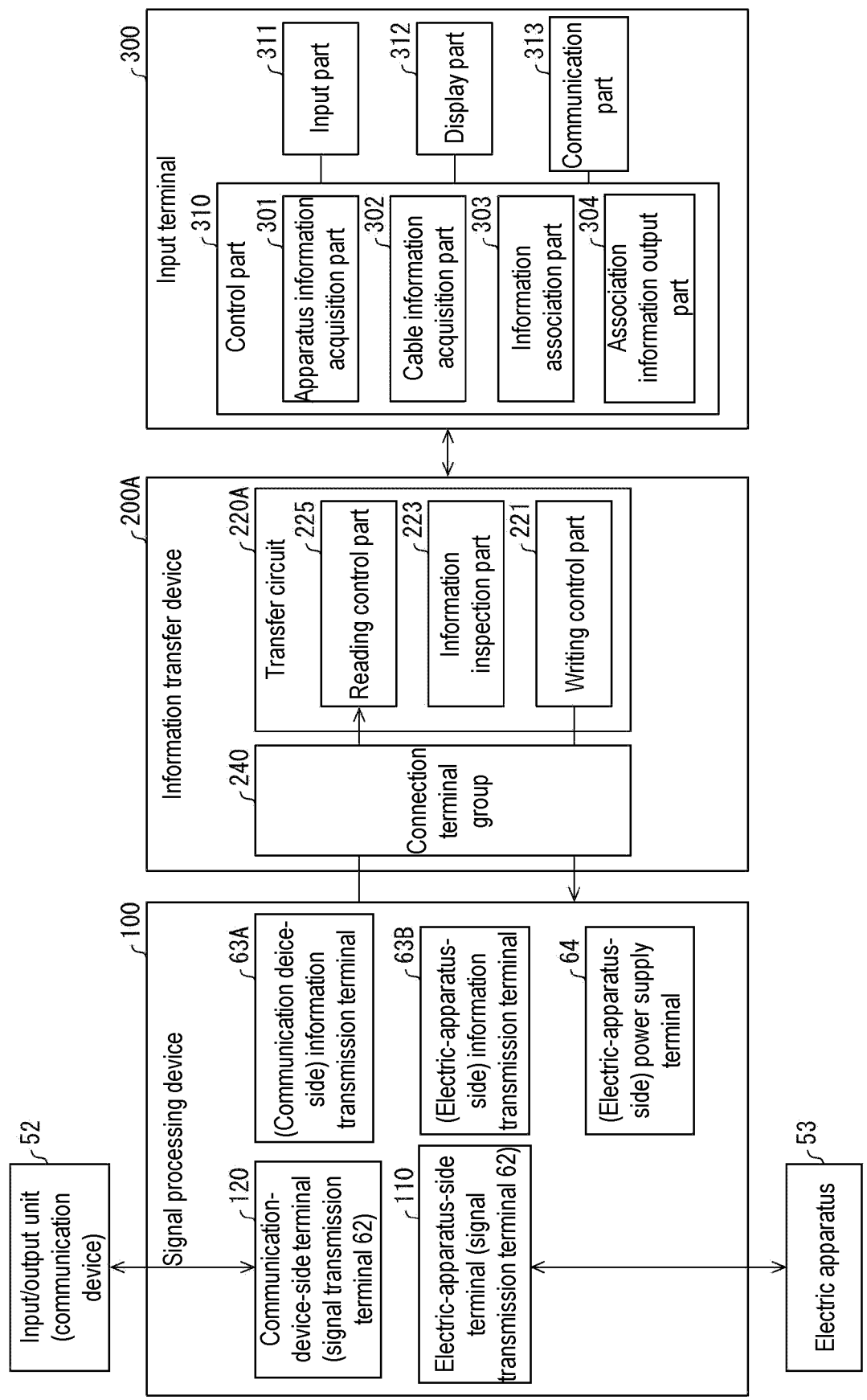
FIG. 11 is a block diagram illustrating configurations of the signal processing device, an information transfer device, and an input terminal according to an aspect of the present disclosure.

FIG. 11 is a block diagram illustrating configurations of the signal processing device 100, the information transfer device 200A, and the input terminal 300 according to an aspect of the present disclosure. The input/output unit 52 illustrated in the drawing is assumed to be compatible with communication using superposed signals similarly to the input unit 4 and the output unit 5.

<Signal Processing Device 100>

The signal processing device 100 is incorporated in the cable casing 50 and partially includes a configuration that the signal processing device 100 described in the first embodiment includes. For example, the signal processing device 100 includes each block illustrated in FIG. 1 and each block in the transmission circuit 15 illustrated in FIG. 2.

In the present embodiment, the information storage part 140 can store prescribed information regarding the electric apparatus 53 and also store cable information that is information unique to the cable casing 50 (signal processing device 100).

The cable information is defined in advance when the cable casing 50 incorporating the signal processing device 100 is manufactured or shipped, for example, and is stored in the information storage part 140.

In one example, a region for storing the prescribed information regarding the electric apparatus 53 and a region for storing the cable information may be configured with different IC memories in the information storage part 140 in the present embodiment. Typically, the former region may be configured with a user programmable ROM such as an Electrically Erasable Programmable Read Only Memory (EEPROM) (registered trademark) in which data is rewritable by the input terminal 300, and the latter region may be configured with an EEPROM, which is an EEPROM different from that in the former region, in which writing is inhibited after setting at the time of shipping.

The electric-apparatus-side terminal 110 (signal transmission terminal) corresponds to the signal transmission terminal 62 provided at the upstream-side end portion 59 of the cable casing 50, and the electric-apparatus-side terminal 110 corresponds to the signal transmission terminal 62 provided at the downstream-side end portion 60, out of the signal transmission terminals 62 described with reference to FIG. 10.

The signal processing device 100 further includes the information transmission terminals 63 for transmitting and receiving information to and from the information transfer device 200A of the input terminal 300 at both end portions of the cable casing 50. Out of the information transmission terminals 63, the information transmission terminal 63 provided at the upstream-side end portion 59 of the cable casing 50 will be referred to as an information transmission terminal 63A, and the information transmission terminal 63 provided at the downstream-side end portion 60 will be referred to as an information transmission terminal 63B, for distinguishing them as needed.

The signal processing device 100 may include a power supply terminal 64 for drawing power from the outside via a signal line as needed. If the power supply terminal 64 is connected to the information transfer device 200A, then the signal processing device 100 can receive power supply from the information transfer device 200A and operate.

In each configuration example described below, the electric-apparatus-side terminal 110 and the communication-device-side terminal 120 (signal transmission terminal) as the signal transmission terminals 62 may also play a role as the information transmission terminals 63 or the power supply terminal 64.

<Information Transfer Device 200A>

The information transfer device 200A includes a mechanism for reading information stored in the signal processing device 100 in addition to the mechanism for writing information in the signal processing device 100 included in the information rewriting device 200 described in the first embodiment.

The information transfer device 200A includes a connection terminal group 240 of various kinds for connection to the signal processing device 100. The information transfer device 200A can read information from the signal processing device 100, write information processed by the transfer circuit 220A in the signal processing device 100, and supply power to the signal processing device 100 as needed by the connection terminal group 240 being connected to the signal transmission terminal 62 or the information transmission terminals 63.

The information transfer device 200A includes a transfer circuit 220A instead of the rewriting circuit 220 of the information rewriting device 200. The transfer circuit 220A is typically configured with hardware such as a micro processing unit (MPU), a field-programmable gate array (FPGA), and the like. The transfer circuit 220A is different from the rewriting circuit 220 in the first embodiment in that the transfer circuit 220A further includes a reading control part 225. In the following description, the information acquisition part 221 in the first embodiment will be referred to as a writing control part 221 for contrast with the reading control part 225. The writing control part 221 indicates a component that is the same as the information acquisition part 221 in the first embodiment. The writing control part 221, the information inspection part 223, and the reading control part 225 of the transfer circuit 220A may be realized by a MPU using information stored in a memory, which is not illustrated, and executing commands of a program that is software for realizing each component, for example.

The reading control part 225 is adapted to acquire cable information from the signal processing device 100 and transfer the cable information to the input terminal 300 in accordance with an instruction from the input terminal 300. In one example, the reading control part 225 receives a superposed signal transmitted from the superposed signal transmission part 155 of the signal processing device 100 via the second input terminal 32, controls the extraction circuit 34, and extracts a data signal indicating the cable information from the superposed signal. The reading control part 225 controls the error detection circuit 35 and performs error detection on the extracted data signal. The reading control part 225 controls the FPGA, for example, and transfers the data signal indicating the cable information and the error detection result to a memory, which can be read by the input terminal 300 and is not illustrated in the drawing. In another example, the reading control part 225 may acquire the cable information from an optical signal or an electrical signal such as a serial signal.

In this manner, the input terminal 300 can read the cable information held by the signal processing device 100 in the cable casing 50 from the memory and process the cable information.

The writing control part 221 acquires association information, for example, as information to be written in the signal processing device 100 from the input terminal 300, causes a writing mechanism such as a light projecting part 210 to operate, and writes the association information in the signal processing device 100. Alternatively, in a case in which the information transfer device 200A and the signal processing device 100 are electrically connected with a signal line that is different from the signal line for supply power, the writing control part 221 may transfer the association information as serial data and electrically write the data.

<Input Terminal 300>

The input terminal 300 is adapted to serve as a tool for managing the association information between the signal processing device 100 in the cable casing 50 and the electric apparatus 53 and provide an execution part (an application, for example) that executes management of the association information and a user interface required by the user to operate the execution part. The input terminal 300 is typically configured with a smartphone, a tablet, a node PC, a dedicated terminal, or the like.

The input terminal 300 includes a control part 310, an input part 311, a display part 312, and a peripheral device interface, which is not illustrated, in an example. The input terminal 300 may include a communication part 313 as needed.

The control part 310 is adapted to collectively control each component in the input terminal 300. The control part 310 may be a processor that executes commands of a program, for example. As the processor, it is possible to use a central processing unit (CPU) or an MPU, for example. The control part 310 according to the example illustrated in FIG. 11 includes blocks of an apparatus information acquisition part 301, a cable information acquisition part 302, an information association part 303, and an association information output part 304. Each of the aforementioned components illustrated as blocks may be realized by the CPU or the MPU reading and executing a program stored in a storage device such as a read only memory (ROM) on a random access memory (RAM), for example. Moreover, in a case in which the input terminal 300 is a mobile terminal such as a smartphone, the control part 310 may include a block, which is not illustrated, for realizing basic tools (such as a phone application, an e-mail application, an address book management application, a camera application, and a two-dimensional code reader application) that a general mobile terminal provides.

The input part 311 is adapted to assist the user in inputting information to the input terminal 300. As the input part 311, a touch panel, a camera (imaging part), or a microphone, for example, is assumed. In a case in which the input part 311 is configured as a touch panel, the touch panel is formed integrally with a display part 312, which will be described later. The input part 311 that serves as a touch panel receives a user's input operation and outputs information corresponding to the input operation to the control part 310 of the input terminal 300.

The display part 312 is adapted to represent information processed by the control part 310 such that the user can visually recognize the information. For example, the display part 312 is configured with a liquid crystal display (LCD), an organic electro-luminescence (EL), display, or the like.

The communication part 313 is adapted to perform communication with an external apparatus such as a PC 2. The communication part 313 may communicate with the PC 2 through Internet communication realized by a wireless local area network (LAN), a wired LAN, or a mobile phone line network. Moreover, the communication part 313 may communicate with the PC 2 through a near-field wireless communication realized via a Bluetooth (registered trademark) or infrared rays or the like.

The peripheral device interface is adapted to communicably connect the input terminal 300 to an external device. The peripheral device interface may include, for example, an adaptor or the like for connection to the information transfer device 200A externally provided via a universal serial bus (USB) or may include an adaptor or the like for writing data in an information storage medium externally provided, such as a USB memory or an SD card and reading data from the information storage medium. Also, the input terminal 300 may be configured integrally with the information transfer device 200A.

[Functional Configuration]
<Input Terminal 300>
The apparatus information acquisition part 301 of the control part 310 acquires apparatus information unique to the electric apparatus 53. A method in which the apparatus information acquisition part 301 acquires the apparatus information is not particularly limited.

The cable information acquisition part 302 acquires cable information unique to the signal processing device 100 in the cable casing 50. In the present embodiment, the cable information acquisition part 302 controls the reading control part 225 of the information transfer device 200A such that cable information is transferred to a memory that can be read by the input terminal 300 from the information storage part 140 of the signal processing device 100 in one example.

The information association part 303 generates association information indicating an association relationship between the apparatus information acquired by the apparatus information acquisition part 301 and the cable information acquired by the cable information acquisition part 302 by associating the apparatus information with the cable information.

The association information output part 304 outputs the association information generated by the information association part 303 such that the association information is supplied to the PC 2. In the present embodiment, the association information output part 304 provides an instruction to write the generated association information in the signal processing device 100 to the information transfer device 200A.

§ 3 Configuration Example (1)

In the configuration example (1), writing of information from the information transfer device 200A to the signal processing device 100 is performed through optical communication, and reading of information from the signal processing device 100 to the information transfer device 200A is performed through superposed signal communication. Also, in the configuration example (1), power of the signal processing device 100 is provided by an external power source capable of supplying a necessary voltage, and the power is supplied from the information transfer device 200A to the signal processing device 100 via a signal line.

Figure 12:
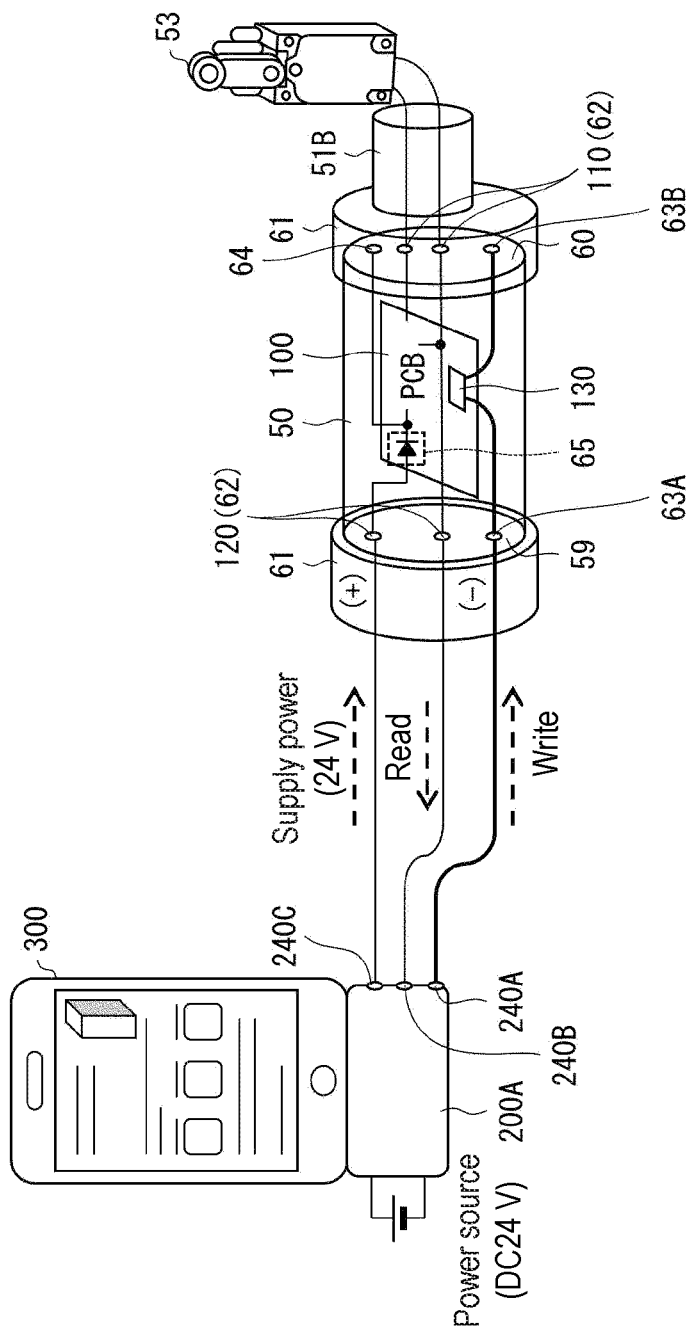
FIG. 12 is a diagram illustrating a configuration of the signal processing device in a configuration example (1) according to an aspect of the present disclosure.
Figure 13:
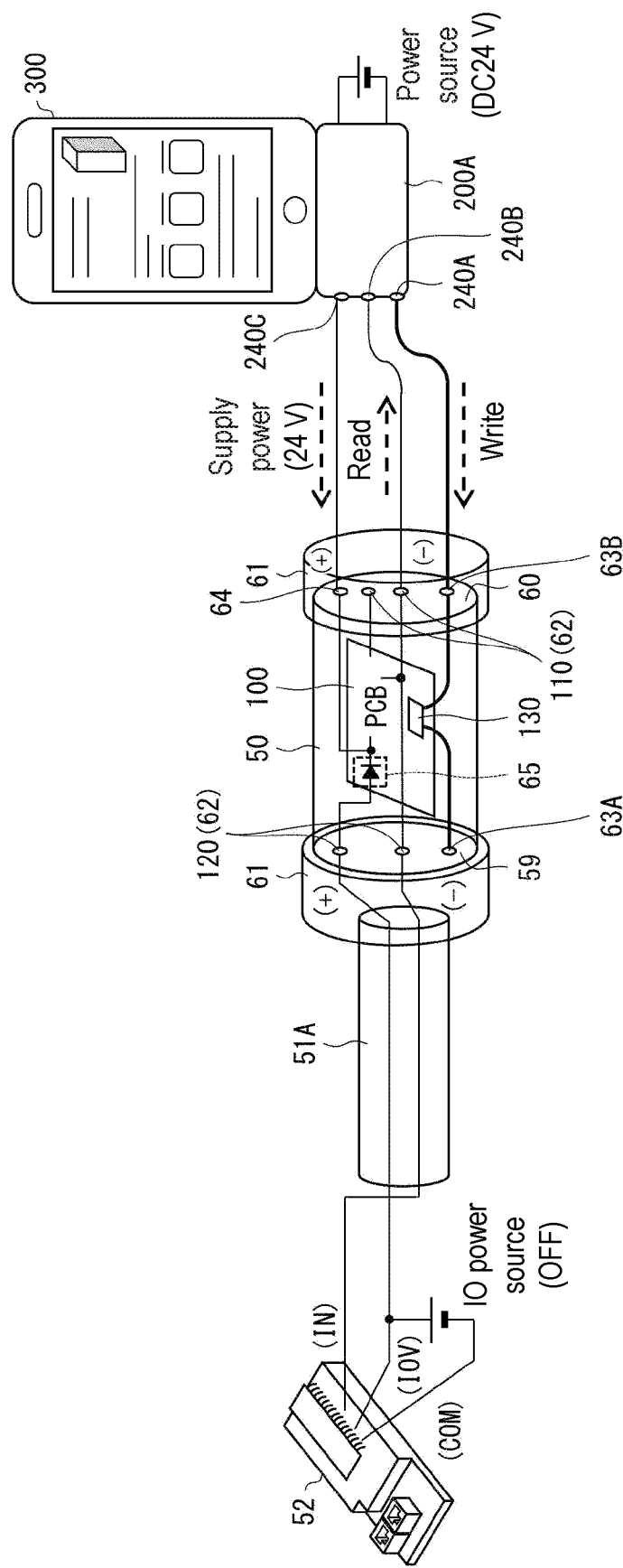
FIG. 13 is a diagram illustrating a configuration of the signal processing device in a configuration example (2) according to an aspect of the present disclosure.

FIGS. 12 and 13 are diagrams illustrating a configuration of the signal processing device 100 in the configuration example (1) according to an aspect of the present disclosure. FIG. 12 illustrates a wiring in a case in which the cable casing 50 that accommodates the signal processing device 100 is connected to the information transfer device 200A at the upstream-side end portion 59. FIG. 13 illustrates a wiring in a case in which the cable casing 50 is connected to the information transfer device 200A at the downstream-side end portion 60.

The signal processing device 100 is accommodated in the cable casing 50 and includes a signal transmission terminal 62, an information transmission terminal 63, and a power supply terminal 64 as terminals to be communicably connected with other devices. In this configuration example, the information transmission terminal 63 is an optical input terminal. Each terminal is provided at end portions of the cable casing 50. Also, the signal processing device 100 includes a light receiving element such as a light receiving part 130 for receiving information to be written through optical communication. In addition, the signal processing device 100 includes an element 65 for preventing power supplied from the power supply terminal 64 from being output to the upstream side.

Specifically, the signal processing device 100 includes the communication-device-side terminal 120 as the signal transmission terminal 62 and the information transmission terminal 63A at the upstream-side end portion 59 of the cable casing 50 and includes the electric-apparatus-side terminal 110 as the signal transmission terminal 62, the information transmission terminal 63B, and the power supply terminal 64 at the downstream-side end portion 60.

When the communication system 1 is operated, the communication-device-side terminal 120 is connected to the input/output unit 52 via the communication cable 51A in order for the signal processing device 100 to transmit and receive a superposed signal to and from the input/output unit 52 as illustrated in FIG. 13. Also, as illustrated in FIG. 12, the electric-apparatus-side terminal 110 is connected to the electric apparatus 53 via the communication cable 51B in order for the signal processing device 100 to transmit and receive an operation signal to and from the electric apparatus 53.

As illustrated in FIG. 12, the signal processing device 100 is connected to the information transfer device 200A via the connector member 61 at the upstream-side end portion 59 at the time of maintenance, for example, when the communication cable 51A is replaced.

The information transfer device 200A includes, as the connection terminal group 240, a first terminal 240A for writing information in the signal processing device 100 through optical communication, a second terminal 240B for reading information from the signal processing device 100, and a third terminal 240C for supply power to the signal processing device 100.

Attachment and detachment can be performed between the first terminal 240A of the information transfer device 200A and the light receiving part 130 of the signal processing device 100 at the location of the information transmission terminal 63A with the connector member 61. If the communication cable 51A is detached, and the information transfer device 200A and the signal processing device 100 are then connected via the connector member 61, then connection can be established with an optical cable from the first terminal 240A to the light receiving part 130 via the connector member 61 and the information transmission terminal 63A.

In this manner, the writing control part 221 of the information transfer device 200A can cause the light projecting part 210 to operate and write information to be written, for example, association information in the signal processing device 100 from the upstream side.

The second terminal 240B of the information transfer device 200A and a (−) terminal with a potential maintained constant (GND, for example) of the communication-device-side terminal 120 of the signal processing device 100 can be connected with a signal line and can be detached and attached at the location of the (−) terminal with the connector member 61. If the communication cable 51A is detached, and the information transfer device 200A and the signal processing device 100 are then connected via the connector member 61, then connection is established with the signal line from the second terminal 240B to the (−) terminal via the connector member 61.

In this manner, the reading control part 225 of the information transfer device 200A can read information on the upstream side of the signal processing device 100. Specifically, the reading control part 225 can receive a superposed signal from the signal processing device 100 via the second terminal 240B, cause the extraction circuit 34, the error detection circuit 35, and the like to operate, and read information held by the signal processing device 100, for example, cable information from the superposed signal.

The third terminal 240C of the information transfer device 200A and a (+) terminal of the communication-device-side terminal 120 can be connected with a signal line and can be detached and attached at the location of the (+) terminal with the connector member 61. If the communication cable 51A is detached, and the information transfer device 200A and the signal processing device 100 are then connected via the connector member 61, then connection is established with the signal line from the third terminal 240C to the (+) terminal via the connector member 61.

In this manner, the information transfer device 200A can supply power supplied from an external power source (DC 24 V, for example) to the signal processing device 100 via the (+) terminal of the communication-device-side terminal 120.

As illustrated in FIG. 13, the signal processing device 100 is connected to the information transfer device 200A via the connector member 61 at the downstream-side end portion 60 at the time of maintenance, for example, when the electric apparatus 53 is replaced.

Detachment and attachment can be achieved between the first terminal 240A and the light receiving part 130 at the location of the information transmission terminal 63B with the connector member 61. If the electric apparatus 53 (communication cable 51B) is detached, and the information transfer device 200A and the signal processing device 100 are connected via the connector member 61, then connection is established with an optical cable from the first terminal 240A to the light receiving part 130 via the connector member 61 and the information transmission terminal 63B.

In this manner, the writing control part 221 of the information transfer device 200A can cause the light projecting part 210 to operate and also write information to be written, for example, association information in the signal processing device 100 from the downstream side as well.

The second terminal 240B and a (−) terminal of the electric-apparatus-side terminal 110 can be connected with a signal line and can be detached and attached by the connector member 61 at the location of the (−) terminal. If the electric apparatus 53 (communication cable 51B) is detached, and the information transfer device 200A and the signal processing device 100 are then connected via the connector member 61, then connection is established with the signal line from the second terminal 240B to the (−) terminal via the connector member 61.

In this manner, the reading control part 225 of the information transfer device 200A can read information from the downstream side of the signal processing device 100 as well. Specifically, the reading control part 225 can receive a superposed signal from the signal processing device 100 via the second terminal 240B, cause the extraction circuit 34, the error detection circuit 35, and the like to operate, and read information held by the signal processing device 100, for example, cable information or the like from the superposed signal.

The third terminal 240C and the power supply terminal 64, which has not been used during the operation, can be connected with a signal line and can be detached and attached by the connector member 61 at the location of the power supply terminal 64. If the electric apparatus 53 (communication cable 51B) is detached, and the information transfer device 200A and the signal processing device 100 are then connected via the connector member 61, then connection is established with a signal line from the third terminal 240C to the power supply terminal 64 via the connector member 61. Although a (+) terminal of the electric-apparatus-side terminal 110 that has been connected to the electric apparatus 53 during the operation is not used, the (+) terminal is protected by the connector member 61 when the information transfer device 200A is connected.

In this manner, the information transfer device 200A can supply power supplied from an external power source (DC 24 V, for example) to the signal processing device 100 via the power supply terminal 64. As described above, the signal processing device 100 includes an element 65 such as a diode from various circuits inside the signal processing device 100 to the (+) terminal of the communication-device-side terminal 120. It is thus possible to prevent the power supplied from the downstream side via the power supply terminal 64 from being output to the upstream side.

Figure 14:
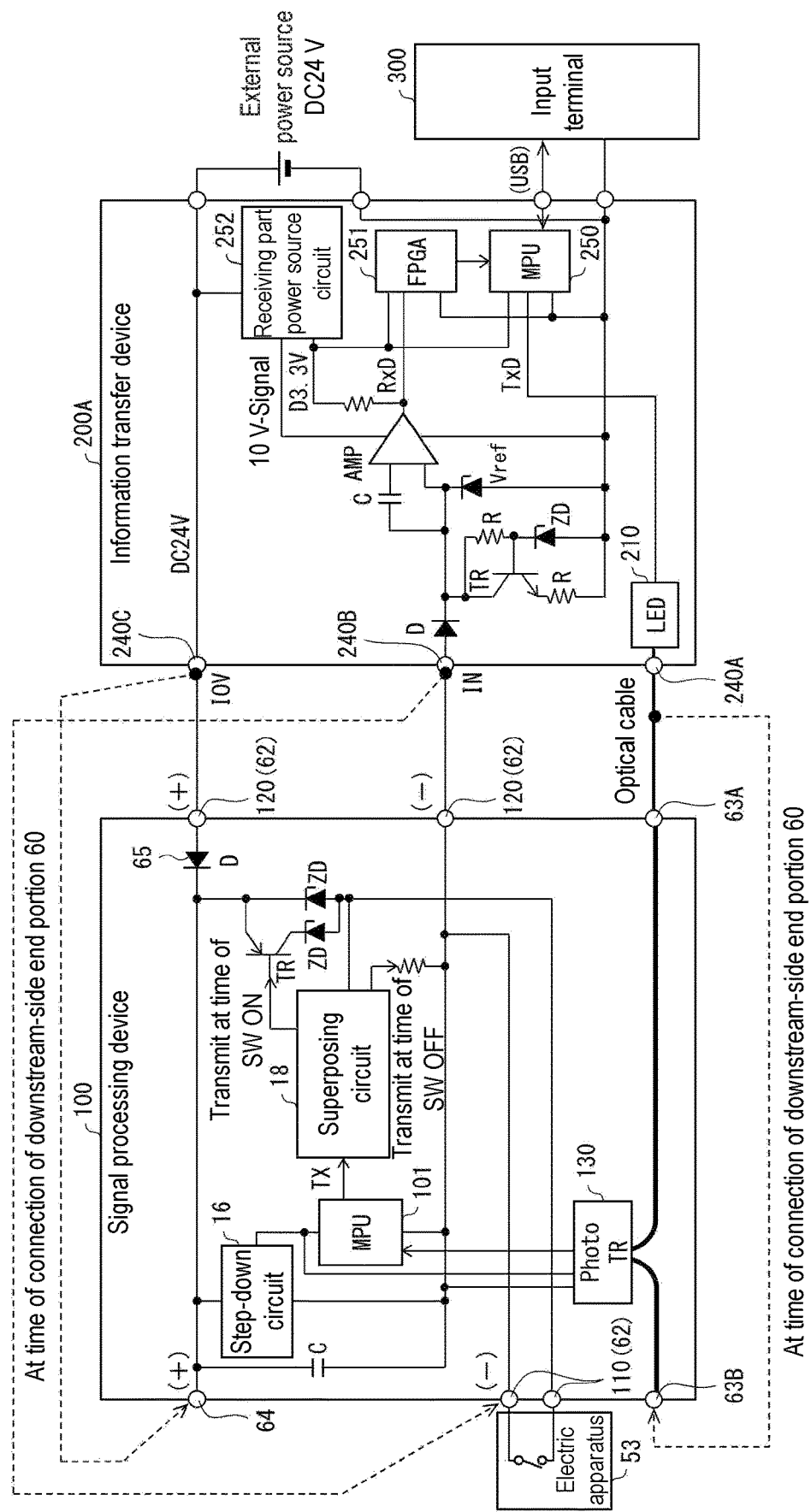
FIG. 14 is a diagram illustrating an example of circuit configurations of the signal processing device and the information transfer device in the configuration example (1) according to an aspect of the present disclosure.

FIG. 14 is a diagram illustrating an example of circuit configurations of the signal processing device 100 and the information transfer device 200A in the configuration example (1) according to an aspect of the present disclosure.

<Information Transfer Device 200A>

The information transfer device 200A includes at least a micro processing unit (MPU) 250, a field-programmable gate array (FPGA) 251, a receiving part power source circuit 252, and a light projecting part 210.

The MPU 250 and the FPGA 251 are hardware for realizing each part of the transfer circuit 220A illustrated in FIG. 11. Each of the writing control part 221, the information inspection part 223, and the reading control part 225 of the transfer circuit 220A is realized by the MPU 250 and the FPGA 251 executing commands of a program stored in a memory, which is not illustrated.

The receiving part power source circuit 252 outputs power supplied from an external power source at a prescribed voltage to each circuit in the information transfer device 200A and the signal processing device 100.

The light projecting part 210 is adapted to project information (TxD) to be written as an optical signal under control of the MPU 250 that operates as the writing control part 221 and is, for example, an LED.

<Signal Processing Device 100>

The signal processing device 100 includes at least an MPU 101 (control part), a step-down circuit 16, a superposing circuit 18, a light receiving part 130, and an element 65.

The MPU 101 is hardware for realizing each part of the transmission control circuit 150 (FIG. 1) included in the signal processing device 100 and the data generation circuit 17 and the diagnostic circuit 19 in the transmission circuit 15 (FIG. 2) included in the signal processing device 100. Each part of the transmission control circuit 150, the data generation circuit 17, and the diagnostic circuit 19 is realized by the MPU 101 executing commands of a program stored in a memory, which is not illustrated.

The step-down circuit 16 steps down the power supplied from the information transfer device 200A via the communication-device-side terminal 120 on the (+) side or the power supply terminal 64 to a prescribed voltage and supplies the prescribed voltage to the MPU 101.

The superposing circuit 18 generates a superposed signal including information (Tx; cable information, for example) to be transmitted to the information transfer device 200A under control of the MPU 101 that operates as the superposed signal transmission part 155 and outputs the superposed signal to the information transfer device 200A.

The element 65 is an active element that prevents power supplied from the power supply terminal 64 from being output to each apparatus on the upstream side via the communication-device-side terminal 120 and is, for example, a diode.

The light receiving part 130 is adapted to receive an optical signal projected from the light projecting part 210 and transfer information to be written to the MPU 101 under control of the MPU 101 that operates as the information rewriting part 153 and is, for example, PhotoTR.

In a case in which the information transfer device 200A is connected to the signal processing device 100 at the upstream-side end portion 59, the MPU 250 that operates as the writing control part 221 causes the light projecting part 210 to output the written information (TxD) as an optical signal. The optical signal projected from the light projecting part 210 is received by the light receiving part 130 such as PhotoTR, for example, via an optical cable and through the first terminal 240A and the information transmission terminal 63A. The MPU 101 that operates as the information rewriting part 153 stores the written information, for example, association information received as an optical signal by the light receiving part 130, in the information storage part 140.

In a case in which the information transfer device 200A is connected to the signal processing device 100 at the downstream-side end portion 60, the optical signal is received by the light receiving part 130 via the optical cable and through the first terminal 240A and the information transmission terminal 63B as illustrated by the dashed line.

In a case in which the information transfer device 200A is connected to the signal processing device 100 at the upstream-side end portion 59, the MPU 101 that operates as the superposed signal transmission part 155 causes the superposing circuit 18 to output read information (Tx) such as cable information, for example, as a superposed signal. The superposed signal output by the superposing circuit 18 is input from the communication-device-side terminal 120 on the (−) side to the FPGA 251 via the signal line and through the second terminal 240B. The FPGA 251 that operates as the reading control part 225 causes the extraction circuit 34 and the error detection circuit 35 to operate, separates the read information (cable information) from the superposed signal, and outputs the read information to the MPU 250. The MPU 250 saves the cable information read from the signal processing device 100 in a memory that is accessible to the input terminal 300.

In a case in which the information transfer device 200A is connected to the signal processing device 100 at the downstream-side end portion 60, the second terminal 240B of the information transfer device 200A is connected to the (−) terminal of the electric-apparatus-side terminal 110 via a signal line as illustrated by the dashed line, and the superposed signal is delivered from the (−) terminal to the second terminal 240B.

In a case in which the information transfer device 200A is connected to the signal processing device 100 at the upstream-side end portion 59, power (DC 24 V, for example) output from the third terminal 240C is supplied to the signal processing device 100 via the (+) terminal of the communication-device-side terminal 120. In a case in which the information transfer device 200A is connected to the signal processing device 100 at the downstream-side end portion 60, power output from the third terminal 240C is supplied to the signal processing device 100 via the power supply terminal 64 as illustrated by the dashed line. The superposing circuit 18 can include the read information in the superposed signal and output the superposed signal from the (−) terminal of the communication-device-side terminal 120 using the supplied power.

With the aforementioned configuration, various terminals are protected by the connector member 61 similarly to the signal transmission terminal 62 during the operation by providing various terminals, such as the signal transmission terminal 62, the information transmission terminal 63, and the power supply terminal 64 needed to read and write information in a surface of the cable casing 50 connected to the connector member 61 in the signal processing device 100. It is thus possible to prevent contamination and degradation of the various terminals and to ensure that information is accurately read and written between the input terminal 300 and the signal processing device 100.

Also, it is possible to write and read information through optical communication without providing a window part in the cable casing 50, and there is thus no disadvantage that information cannot be read and written due to contamination of the window part.

In addition, the signal processing device 100 includes the various terminals both at the upstream-side end portion 59 and at the downstream-side end portion 60 of the cable casing 50. In this manner, regardless of which of the upstream-side end portion 59 and the downstream-side end portion 60 of the cable casing 50 is detached at the time of maintenance, it is possible to connect the information transfer device 200A to the signal processing device 100 from the detached side and to read and write information. Therefore, convenience when the maintenance is performed is improved.

Moreover, the signal processing device 100 (specifically, the MPU 101) receives power supply from the information transfer device 200A via the signal transmission terminal 62. With the aforementioned configuration, the MPU 101 receives power supply from the signal transmission terminal 62 when the signal processing device 100 is connected to the input/output unit 52 during the operation of the communication system 1, and also, power supply can be received through a power supply method similar to this even when the signal processing device 100 is connected to the information transfer device 200A at the time of maintenance or the like. Therefore, there is an advantage that it is not necessary to separately provide a wiring to supply power for connection to the information transfer device 200A.

§ 4 Configuration Example (2)

In the configuration example (2), reading and writing of information are performed on the signal processing device 100 similarly to the configuration example (1). However, in the configuration example (2), it is assumed that power of the signal processing device 100 is provided by the input terminal 300 or a battery with a relatively low voltage, and the power is boosted to a necessary voltage by the information transfer device 200A and is then supplied to the signal processing device 100 via a signal line.

The configuration of the signal processing device 100 and the wiring between the signal processing device 100 and the information transfer device 200A in the configuration example (2) according to an aspect of the present disclosure are as illustrated in FIGS. 12 and 13. In FIGS. 12 and 13, the configuration example (2) is different from the configuration example (1) in that the information transfer device 200A is not connected to the external power source (DC 24 V). In the configuration example (2), nothing is connected as a power source to the information transfer device 200A, or a battery (DC 3 V, for example) is connected thereto instead of the external power source (DC 24 V).

Figure 15:
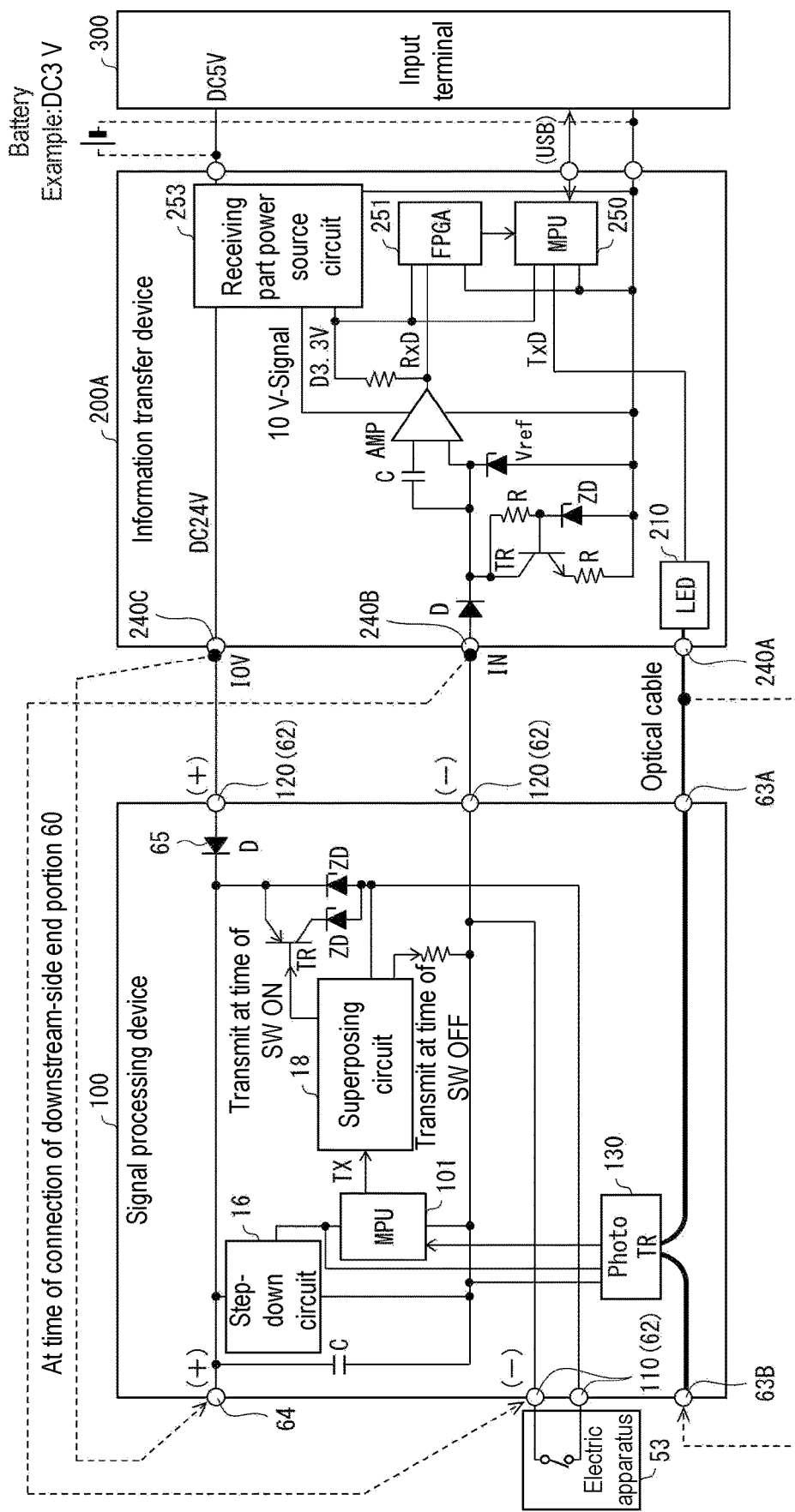
FIG. 15 is a diagram illustrating an example of circuit configurations of the signal processing device and the information transfer device in the configuration example (2) according to an aspect of the present disclosure.

FIG. 15 is a diagram illustrating an example of circuit configurations of the signal processing device 100 and the information transfer device 200A in the configuration example (2) according to an aspect of the present disclosure.
<Information Transfer Device 200A>

The information transfer device 200A according to this configuration example includes a receiving part power source circuit 253 capable of boosting an input power to a prescribed voltage instead of the receiving part power source circuit 252 as compared with the information transfer device 200A in the configuration example (1).

The receiving part power source circuit 253 adjusts a relatively low voltage of power supplied from the battery or the input terminal 300 to a prescribed voltage, outputs the prescribed voltage to each circuit in the information transfer device 200A, boosts the supplied power to a prescribed voltage (24 V, for example) necessary to drive the signal processing device 100, and outputs the prescribed voltage to the signal processing device 100. It is thus possible to supply power at the voltage of 24 V from the information transfer device 200A to the signal processing device 100 similarly to the configuration example (1).
<Signal Processing Device 100>

The circuit configuration of the signal processing device 100 according to the configuration example (2) is similar to that in the configuration example (1).

With the aforementioned configuration, various terminals of the signal processing device 100 are protected by the connector member 61 during the operation similarly to the configuration example (1). Therefore, it is possible to prevent degradation of the various terminals and to ensure that information is accurately read and written between the input terminal 300 and the signal processing device 100.

Also, regardless of which of the upstream-side end portion 59 and the downstream-side end portion 60 of the cable casing 50 is detached at the time of maintenance, it is possible to connect the information transfer device 200A to the signal processing device 100 from the detached side and to read and write information similarly to the configuration example (1). Therefore, convenience when the maintenance is performed is improved.

§ 5 Configuration Example (3)

In the configuration example (3), writing of information from the information transfer device 200A to the signal processing device 100 is performed through optical communication, and reading of information from the signal processing device 100 to the information transfer device 200A is also performed through optical communication. Also, in the configuration example (3), power of the signal processing device 100 is provided by the input terminal 300 or a battery, and the information transfer device 200A boosts the power to a prescribed voltage as needed and supplies the prescribed voltage to the signal processing device 100 via a signal line.

Figure 16:
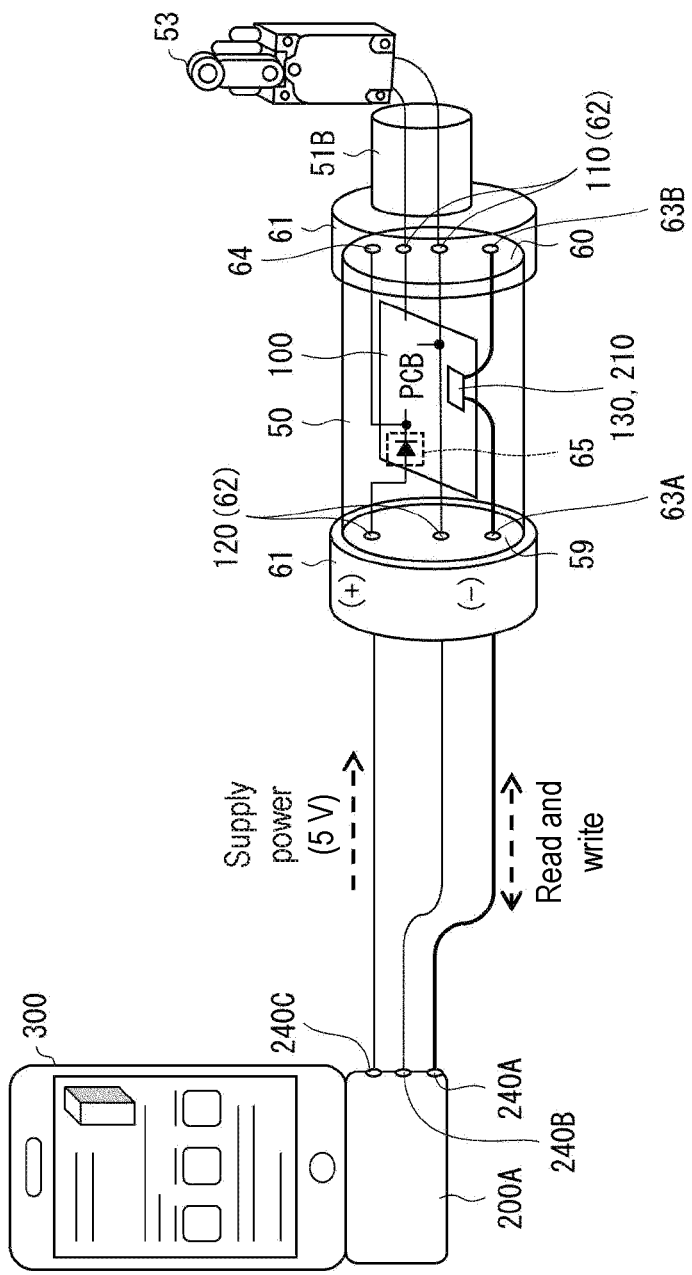
FIG. 16 is a diagram illustrating a configuration of the signal processing device in a configuration example (3) according to an aspect of the present disclosure.
Figure 17:
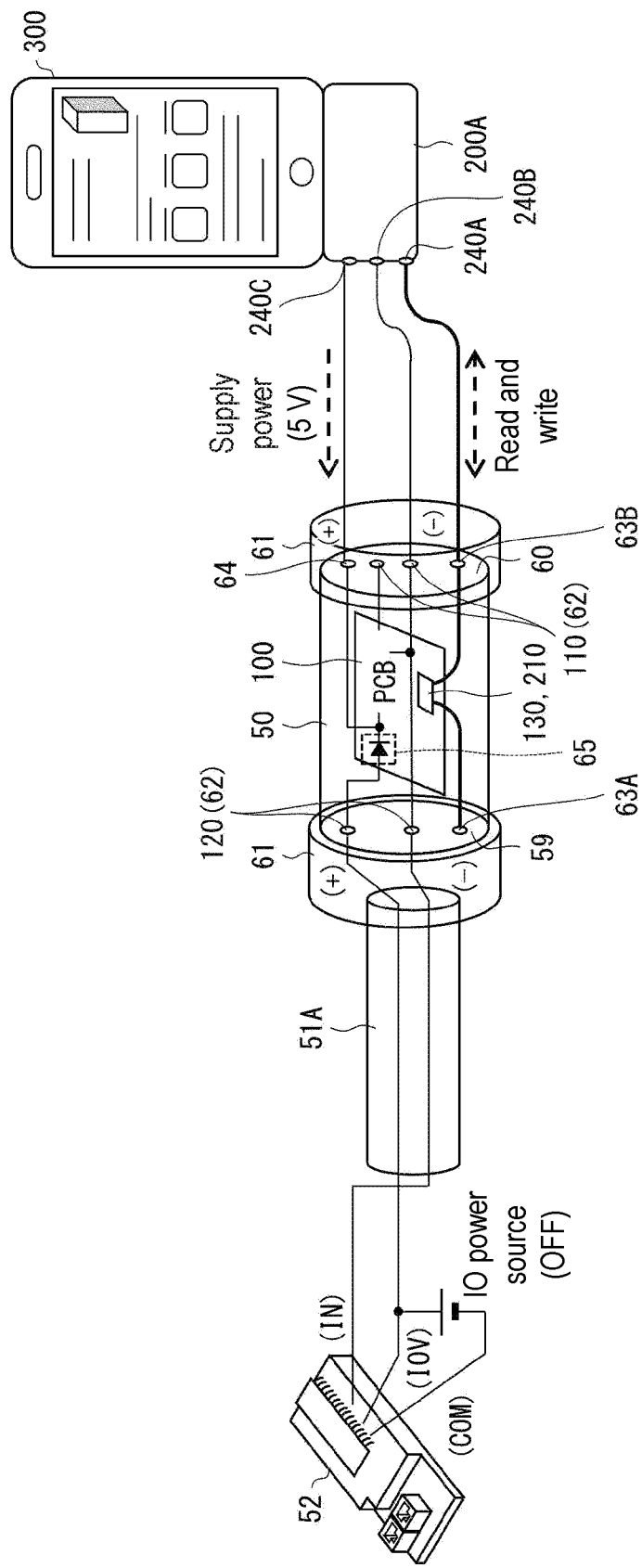
FIG. 17 is a diagram illustrating a configuration of the signal processing device in the configuration example (3) according to an aspect of the present disclosure.

FIGS. 16 and 17 are diagrams illustrating a configuration of the signal processing device 100 in the configuration example (3) according to an aspect of the present disclosure. FIG. 16 illustrates a wiring in a case in which the cable casing 50 that accommodates the signal processing device 100 is connected to the information transfer device 200A at the upstream-side end portion 59. FIG. 17 illustrates a wiring in a case in which the cable casing 50 is connected to the information transfer device 200A at the downstream-side end portion 60.

The signal processing device 100 according to the configuration example (3) is different from the signal processing devices 100 according to the configuration examples (1) and (2) in that the signal processing device 100 according to the configuration example (3) includes a light emitting element such as an LED (light projecting part 210) to transmit read information through optical communication in addition the light receiving element such as a photo transistor (light receiving part 130) in order to receive information written through optical communication. Also, the information transmission terminal 63 is an optical input terminal and is also an optical output terminal in this configuration example.

Also, in this configuration example, the communication-device-side terminal 120 on the (+) side of the signal processing device 100 receives power (5 V, for example) of the input terminal 300 from the information transfer device 200A connected from the upstream side. In addition, the power supply terminal 64 of the signal processing device 100 receives power (5 V, for example) of the input terminal 300 from the information transfer device 200A connected from the downstream side.

Also, the signal processing device 100 includes an element 65 for preventing power supplied from the power supply terminal 64 from being output to the upstream side similarly to the configuration examples (1) and (2).

As illustrated in FIG. 16, the signal processing device 100 is connected to the information transfer device 200A at the upstream-side end portion 59 via the connector member 61 at the time of maintenance, for example, when the communication cable 51A is replaced.

The information transfer device 200A includes, as the connection terminal group 240, a first terminal 240A for reading and writing information in the signal processing device 100 through optical communication, a second terminal 240B that is connected to the (−) terminal of the communication-device-side terminal 120 with a maintained reference potential in the signal processing device 100, and a third terminal 240C for supplying power to the signal processing device 100.

The first terminal 240A of the information transfer device 200A and the light receiving part 130 and the light projecting part 210 of the signal processing device 100 can be detached and attached by the connector member 61 at the location of the information transmission terminal 63A. If the communication cable 51A is detached, and the information transfer device 200A and the signal processing device 100 are then connected via the connector member 61, connection is established with an optical cable from the first terminal 240A to the light receiving part 130 and the light projecting part 210 via the connector member 61 and the information transmission terminal 63A.

In this manner, the writing control part 221 of the information transfer device 200A can cause the light projecting part 210 of the information transfer device 200A itself to operate and write information to be written, for example, association information, in the signal processing device 100 from the upstream side. On the other hand, the reading control part 225 of the information transfer device 200A can read the information regarding the signal processing device 100, for example, cable information, by causing the light receiving part 130 in the information transfer device 200A itself to operate and receiving the optical signal projected from the light projecting part 210 of the signal processing device 100.

As will be described later, the optical signal input via the information transmission terminal 63 of the signal processing device 100 is separated on a print circuit board (PCB) of the signal processing device 100, for example, and is then delivered to the light receiving part 130. The optical signal projected from the light projecting part 210 is also output via the same information transmission terminal 63. Therefore, only one optical cable is needed to connect the information transmission terminal 63 of the signal processing device 100 to the first terminal 240A of the information transfer device 200A, and it is not necessary to provide optical cables for writing information and for reading information.

In this configuration example, the reading control part 225 extracts information regarding the signal processing device 100 from the optical signal received by the light receiving part 130 of the information transfer device 200A. Therefore, the information transfer device 200A may not include a circuit configuration (for example, the extraction circuit 34, the error detection circuit 35, and the like) for receiving the superposed signal in this configuration example.

The third terminal 240C of the information transfer device 200A and the (+) terminal of the communication-device-side terminal 120 can be connected with a signal line and can be attached and detached by the connector member 61 at the location of the (+) terminal. If the communication cable 51A is detached, and the information transfer device 200A and the signal processing device 100 are then connected via the connector member 61, then connection is established with the signal line from the third terminal 240C to the (+) terminal via the connector member 61.

In this manner, the information transfer device 200A can supply power (DC 5 V, for example) supplied from the input terminal 300 to the signal processing device 100 via the (+) terminal of the communication-device-side terminal 120.

In the configuration examples (1) and (2), it is necessary for the signal processing device 100 to send the superposed signal to realize reading of information, and the signal processing device 100 thus requires a relatively high voltage (24 V, for example). On the other hand, the signal processing device 100 is driven with a relatively low voltage (5 V, for example) since reading of information is realized through optical communication in this configuration example.

Therefore, it is only necessary for the information transfer device 200A to output power (the voltage is, for example, 5 V) supplied using the input terminal 300 as a power source as it is to the communication-device-side terminal 120 on the (+) side via the third terminal 240C. Alternatively, it is only necessary for the information transfer device 200A to boost power (the voltage is, for example, 3 V) supplied using a battery or the like as a power source to 5 V and output 5 V from the third terminal 240C to the communication-device-side terminal 120 on the (+) side.

As illustrated in FIG. 17, the signal processing device 100 is connected to the information transfer device 200A at the downstream-side end portion 60 via the connector member 61 at the time of maintenance, for example, when the electric apparatus 53 is replaced.

Detachment and attachment can be achieved between the first terminal 240A and the light receiving part 130 and the light projecting part 210 of the signal processing device 100 at the location of the information transmission terminal 63B by the connector member 61. If the electric apparatus 53 (communication cable 51B) is detached, and the information transfer device 200A and the signal processing device 100 are then connected via the connector member 61, connection is established with an optical cable from the first terminal 240A to the light receiving part 130 and the light projecting part 210 via the connector member 61 and the information transmission terminal 63B.

In this manner, the writing control part 221 of the information transfer device 200A can write information to be written, for example, association information, in the signal processing device 100 from the downstream side as well similarly to the case when the connection is established from the upstream side. On the other hand, the reading control part 225 of the information transfer device 200A can also read information regarding the signal processing device 100, for example, cable information, from the downstream side as well.

The second terminal 240B and the (−) terminal with a maintained reference potential of the electric-apparatus-side terminal 110 can be connected with a signal line and can be detached and attached by the connector member 61 at the location of the (−) terminal.

The third terminal 240C and the power supply terminal 64 that has not been used during the operation can be connected with a signal line and can be detached and attached by the connector member 61 at the location of the power supply terminal 64. If the electric apparatus 53 (communication cable 51B) is detached, and the information transfer device 200A and the signal processing device 100 are then connected via the connector member 61, then connection is established with the signal line from the third terminal 240C to the power supply terminal 64 via the connector member 61.

In this manner, the information transfer device 200A can supply power supplied from the input terminal 300 or power supplied from the battery to the signal processing device 100 via the power supply terminal 64 even at the time of connection from the downstream side similarly to the case at the time of connection from the upstream side.

Figure 18:
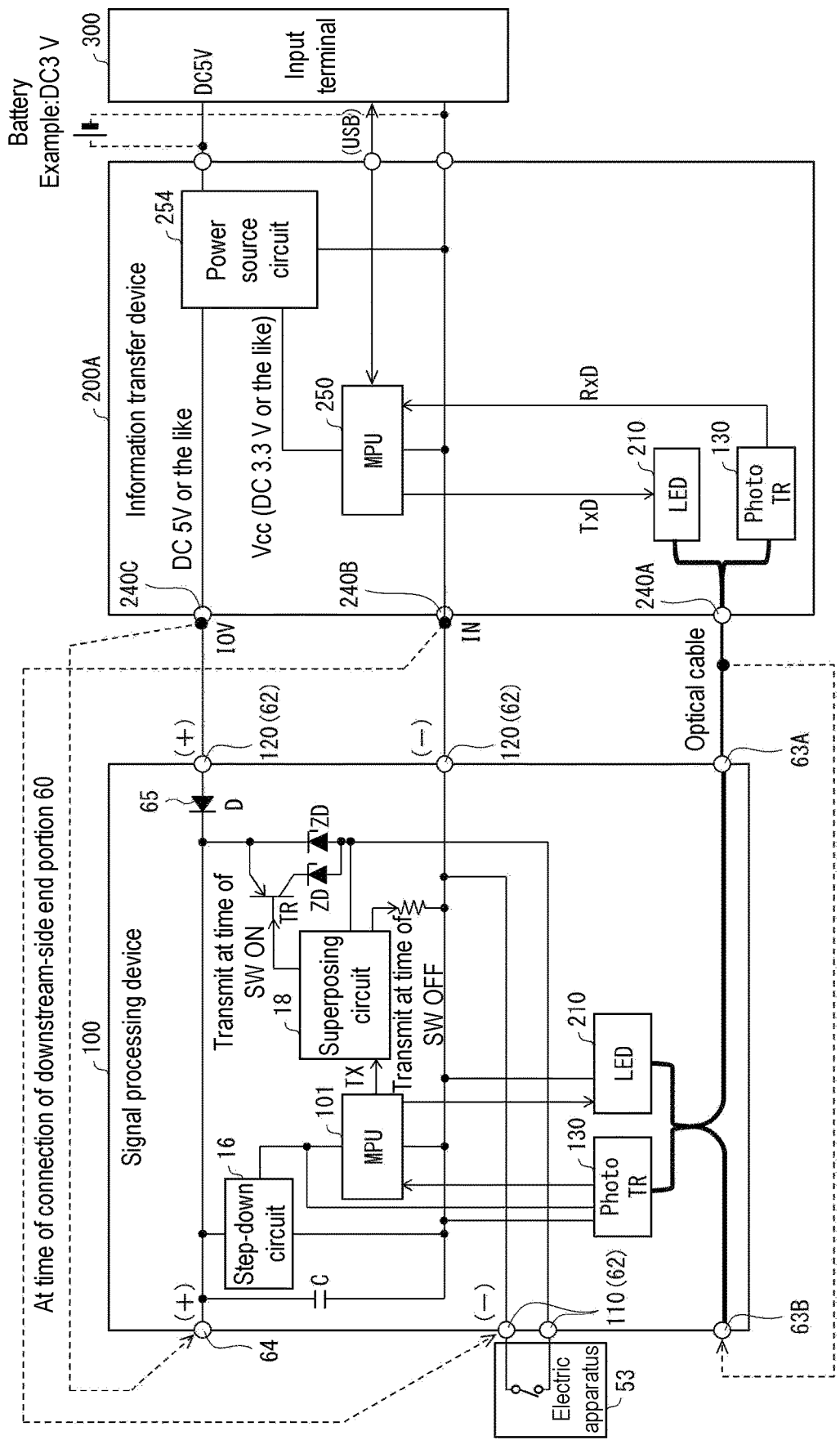
FIG. 18 is a diagram illustrating an example of circuit configurations of the signal processing device and the information transfer device in the configuration example (3) according to an aspect of the present disclosure.

FIG. 18 is a diagram illustrating an example of circuit configurations of the signal processing device 100 and the information transfer device 200A in the configuration example (3) according to an aspect of the present disclosure.
<Information Transfer Device 200A>

The information transfer device 200A includes at least an MPU 250, a power source circuit 254, a light projecting part 210, and a light receiving part 130. The information transfer device 200A according to this configuration example includes the power source circuit 254 instead of the receiving part power source circuits 252 and 253 as compared with the configuration examples (1) and (2). Also, the information transfer device 200A includes the light receiving part 130 in addition to the light projecting part 210.

The power source circuit 254 outputs power at a relatively low voltage supplied from the battery or the input terminal 300 to each circuit in the information transfer device 200A with the voltage adjusted as needed and also outputs the power to the signal processing device 100 as well. In one example, in a case in which power at a voltage of 5 V is received from the input terminal 300, the power source circuit 254 steps down the power to 3.3 V, outputs the power to the MPU 250, and outputs the power with no change from 5 V to the signal processing device 100 via the third terminal 240C. Also, in a case in which power at a voltage of 3 V is received from the battery, the power source circuit 254 boosts the received power to 5 V and outputs the power to the signal processing device 100 via the third terminal 240C.

The MPU 250 operates as the writing control part 221 when the MPU 250 writes information acquired from the input terminal 300 in the signal processing device 100. Specifically, the MPU 250 that serves as the writing control part 221 causes the light projecting part 210 (an LED, for example) to operate and outputs writing information (TxD) as an optical signal from the first terminal 240A to the signal processing device 100.

The MPU 250 operates as the reading control part 225 to transfer information read from the signal processing device 100 to the input terminal 300. Specifically, the MPU 250 that serves as the reading control part 225 causes the light receiving part 130 (PhotoTR, for example) to operate and reads information from the signal processing device 100. Specifically, the reading control part 225 transfers read information (RxD) included in the optical signal received by the light receiving part 130 from the light projecting part 210 of the signal processing device 100 to a prescribed memory that is accessible to the input terminal 300.

Since it is not necessary to acquire read information as a superposed signal in this configuration example, the information transfer device 200A may not include the configuration to process the superposed signal, specifically the FPGA 251 that operates as the extraction circuit 34 and the error detection circuit 35.
<Signal Processing Device 100>

In the configuration example (3), the signal processing device 100 further includes a light projecting part 210 as compared with the configuration examples (1) and (2). Also, the signal processing device 100 in this configuration example includes an information reading part, which is not illustrated, as a part of the transmission control circuit 150 (FIG. 1). The information reading part may be realized by the MPU 101 executing commands of a program that is software for realizing each component using information stored in a memory similarly to the monitoring part 151, the information rewriting part 153, and the superposed signal transmission part 155.

The MPU 101 that operates as the information reading part reads information stored in the information storage part 140, for example, cable information, causes the light projecting part 210 to operate, and sends an optical signal including the cable information to the information transfer device 200A via the information transmission terminal 63 and the first terminal 240A.

With the aforementioned configuration, the various terminals of the signal processing device 100 are protected by the connector member 61 during the operation similarly to the configuration examples (1) and (2). Therefore, it is possible to prevent degradation of the various terminals and to ensure that information is accurately read and written between the input terminal 300 and the signal processing device 100.

Also, regardless of which of the upstream-side end portion 59 and the downstream-side end portion 60 of the cable casing 50 is detached at the time of maintenance, it is possible to connect the information transfer device 200A to the signal processing device 100 from the detached side and to read and write information similarly to the configuration examples (1) and (2). Therefore, convenience when the maintenance is performed is improved.

Moreover, since the reading of information can be realized through optical communication in this configuration example, it is not necessary to provide a circuit for receiving a superposed signal such as an FPGA 251 in the information transfer device 200A. Also, since it is not necessary to perform superposed signal communication between the signal processing device 100 and the information transfer device 200A in this configuration example as compared with the configuration examples (1) and (2), it is possible to supply power at a relatively low voltage such as 5 V, for example, without maintaining a relatively high voltage such as 24 V for power supply to the signal processing device 100.

§ 6 Configuration Example (4)

In the configuration example (4), writing of information from the information transfer device 200A to the signal processing device 100 and reading of information from the signal processing device 100 to the information transfer device 200A are electrically performed. Specifically, the information transfer device 200A and the signal processing device 100 are connected with a serial bus, and reading and writing of information are performed through serial communication. Also, a third signal line dedicated to supply power is provided separately from the first signal line used for superposed signal communication during the operation and the second signal line constituting the aforementioned serial bus in the configuration example (4). In the configuration example (4), power of the signal processing device 100 is provided by the input terminal 300, a battery, or the like. The information transfer device 200A steps down the power supplied from the input terminal 300 or the battery to a necessary voltage and outputs the necessary voltage to the signal processing device 100 via the third signal line.

Figure 19:
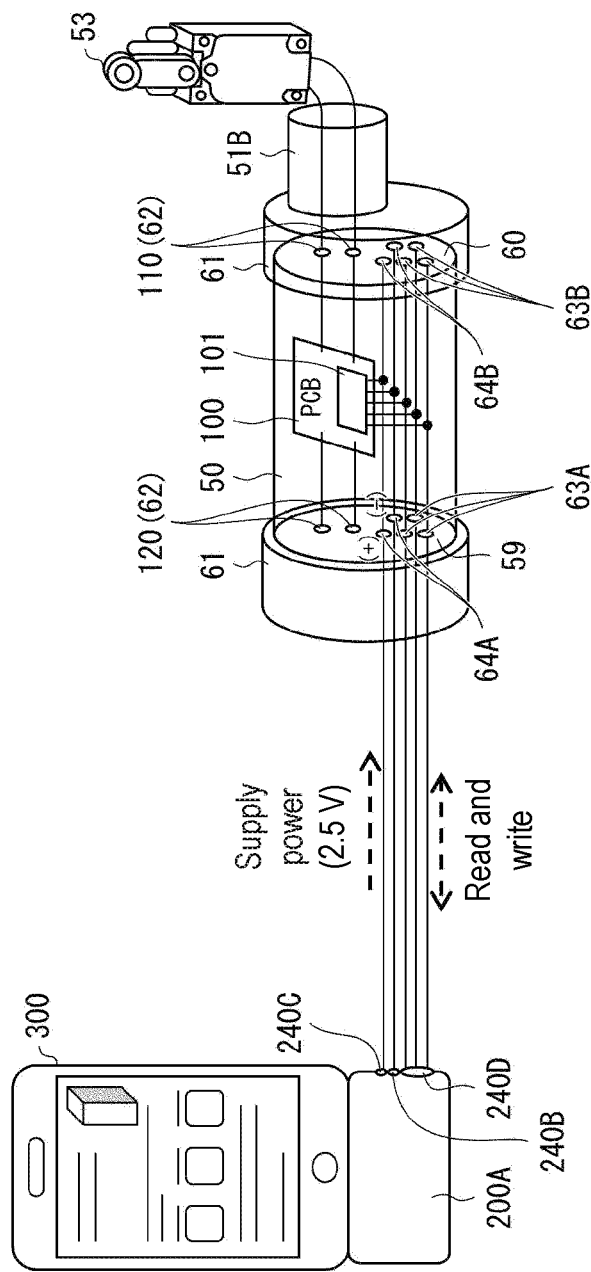
FIG. 19 is a diagram illustrating a configuration of the signal processing device in a configuration example (4) according to an aspect of the present disclosure.
Figure 20:
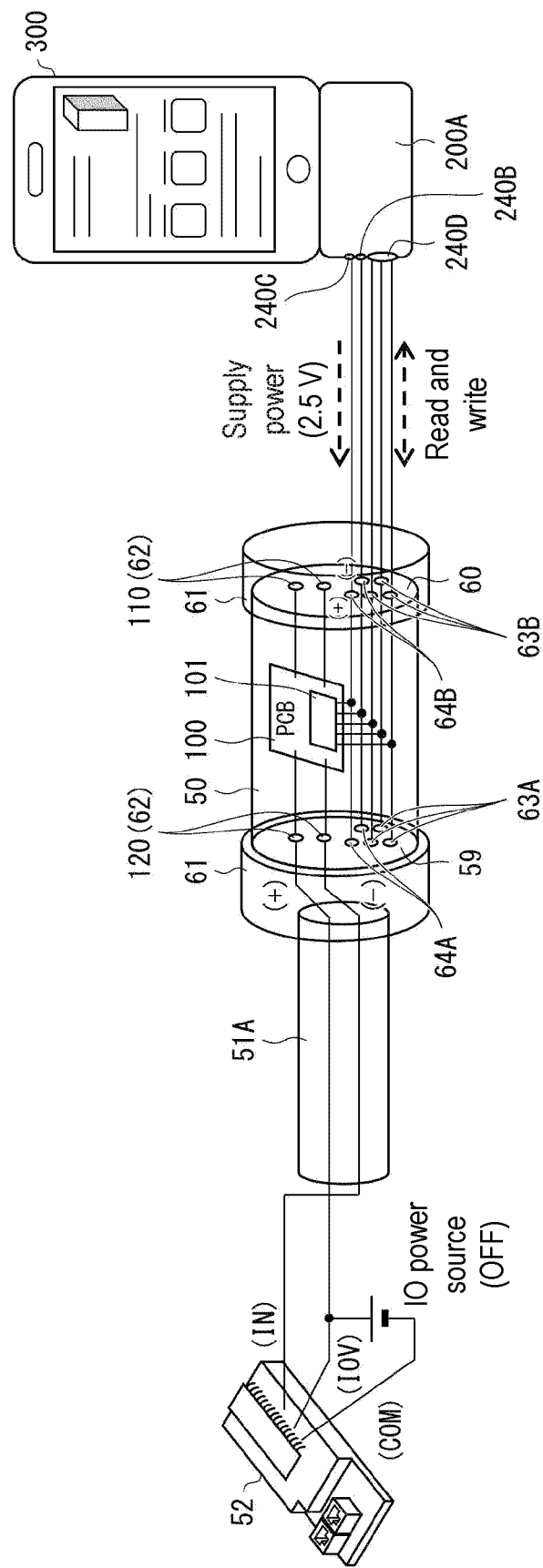
FIG. 20 is a diagram illustrating a configuration of the signal processing device in the configuration example (4) according to an aspect of the present disclosure.

FIGS. 19 and 20 are diagrams illustrating a configuration of the signal processing device 100 in the configuration example (4) according to an aspect of the present disclosure. FIG. 19 illustrates a wiring in a case in which the cable casing 50 that accommodates the signal processing device 100 is connected to the information transfer device 200A at the upstream-side end portion 59. FIG. 20 illustrates a wiring in a case in which the cable casing 50 is connected to the information transfer device 200A at the downstream-side end portion 60.

The signal processing device 100 is accommodated in the cable casing 50 and includes, as terminals that enable communication with other devices, the signal transmission terminal 62, the information transmission terminals 63, and the power supply terminals 64. In this configuration example, the information transmission terminal 63 is an electrical signal input/output terminal. Each terminal is provided at end portions of the cable casing 50.

For example, the signal processing device 100 includes the communication-device-side terminal 120 that serves as the signal transmission terminal 62, a power supply terminal 64A that is for receiving power supply from the information transfer device 200A, and an information transmission terminal 63A at the upstream-side end portion 59 of the cable casing 50. Also, the signal processing device 100 includes the electric-apparatus-side terminal 110 that serves as the signal transmission terminal 62, a power supply terminal 64B that is for receiving power supply from the information transfer device 200A, and an information transmission terminal 63B at the downstream-side end portion 60.

More specifically, the signal processing device 100 includes (+) terminal that receives power supplied from the information transfer device 200A at a prescribed voltage and a (−) terminal maintained at a reference potential as the power supply terminals 64 (64A, 64B).

Also, the signal processing device 100 includes the information transmission terminals 63A and 63B in accordance with the number of signal lines needed in accordance with the standard of the serial bus used for the serial communication. In one example, one-to-one connection between the MPU 250 (a master, for example) of the information transfer device 200A and the MPU 101 (a slave, for example) of the signal processing device 100 via a serial peripheral interface (SPI) bus is defined. In this case, three signal lines, namely a signal line for transmitting clock signals, a signal line for transferring downlink data (master OUT slave IN), and a signal line for transferring uplink data (master IN slave OUT) are used as the second signal lines, and the signal processing device 100 thus includes three information transmission terminals 63A and three information transmission terminals 63B.

The communication-device-side terminal 120 is connected to the input/output unit 52 via the communication cable 51A including two first signal lines in order for the signal processing device 100 to transmit and receive a superposed signal to and from the input/output unit 52 as illustrated in FIG. 20 during the operation of the communication system 1. Also, the electric-apparatus-side terminal 110 is connected to the electric apparatus 53 via the communication cable 51B including two first signal lines in order for the signal processing device 100 to transmit and receive an operation signal to and from the electric apparatus 53 as illustrated in FIG. 19.

As illustrated in FIG. 19, the signal processing device 100 is connected to the information transfer device 200A via the connector member 61 at the upstream-side end portion 59 at the time of maintenance, for example, when the communication cable 51A is replaced.

The information transfer device 200A includes, as the connection terminal group 240, the third terminal 240C that is for supplying power to the signal processing device 100, the second terminal 240B that is connected to the (−) terminal of the power supply terminal 64A with a maintained reference potential in the signal processing device 100, and fourth terminals 240D that perform serial communication with the signal processing device 100 to electrically read and write information. The fourth terminals 240D are provided in accordance with the number of signal lines needed in accordance with the standard of the serial bus used for the serial communication. In one example, in a case in which an SPI is employed for the serial communication, the information transfer device 200A includes three fourth terminals 240D.

The information transmission terminal 63A of the signal processing device 100 is connected to the fourth terminal 240D of the information transfer device 200A via the connector member 61 and the second signal line (serial bus) and can be detached and attached by the connector member 61 at the location of the information transmission terminal 63A. If the communication cable 51A is detached, and the information transfer device 200A and the signal processing device 100 are then connected via the connector member 61, then the MPU 250 of the information transfer device 200A and the MPU 101 of the signal processing device 100 are electrically communicably connected via the fourth terminal 240D, the second signal line, the connector member 61, and the information transmission terminal 63A.

In this manner, the writing control part 221 of the information transfer device 200A can write information to be written, for example, association information in the signal processing device 100 from the upstream side. Also, the reading control part 225 of the information transfer device 200A can read information, for example, cable information from the upstream side of the signal processing device 100.

The second terminal 240B of the information transfer device 200A and the (−) terminal with a potential maintained constant (GND, for example) of the power supply terminal 64A of the signal processing device 100 are connected with a third signal line for supplying power and can be detached and attached by the connector member 61 at the location of the (−) terminal. If the communication cable 51A is detached and the information transfer device 200A and the signal processing device 100 are then connected via the connector member 61, then connection is established with the third signal line from the second terminal 240B to the (−) terminal via the connector member 61.

The third terminal 240C of the information transfer device 200A and the (+) terminal of the power supply terminal 64A can be connected with another third signal line and can be detached and attached by the connector member 61 at the location of the (+) terminal. If the communication cable 51A is detached and the information transfer device 200A and the signal processing device 100 are then connected via the connector member 61, then connection is established with the aforementioned third signal line from the third terminal 240C to the (+) terminal via the connector member 61.

In this manner, the information transfer device 200A can adjust power supplied from the input terminal 300 or the battery to a necessary voltage, then output the necessary voltage from the third terminal 240C, and supply the necessary voltage to the signal processing device 100 via the (+) terminal of the power supply terminal 64A.

As illustrated in FIG. 20, the signal processing device 100 is connected to the information transfer device 200A via the connector member 61 at the downstream-side end portion 60 at the time of maintenance, for example, when the electric apparatus 53 is replaced.

The information transmission terminal 63B of the signal processing device 100 is connected to the fourth terminal 240D of the information transfer device 200A via the connector member 61 and the second signal line (serial bus) and can be detached and attached by the connector member 61 at the location of the information transmission terminal 63B. If the electric apparatus 53 (communication cable 51B) is detached, and the information transfer device 200A and the signal processing device 100 are then connected via the connector member 61, then the MPU 250 of the information transfer device 200A and the MPU 101 of the signal processing device 100 are electrically communicably connected via the fourth terminal 240D, the second signal line, the connector member 61, and the information transmission terminal 63B.

In this manner, the writing control part 221 of the information transfer device 200A can write information to be written, for example, association information in the signal processing device 100 from the downstream side as well. Also, the reading control part 225 of the information transfer device 200A can read information, for example, cable information of the signal processing device 100 from the downstream side as well.

The second terminal 240B and the (−) terminal of the power supply terminal 64B can be connected with the third signal line and can be detached and attached by the connector member 61 at the location of the (−) terminal. If the electric apparatus 53 (communication cable 51B) is detached, and the information transfer device 200A and the signal processing device 100 are then connected via the connector member 61, then connection is established with the third signal line from the second terminal 240B to the (−) terminal via the connector member 61.

The third terminal 240C and the (+) terminal of the power supply terminal 64B can be connected with another third signal line and can be detached and attached by the connector member 61 at the location of the (+) terminal. If the electric apparatus 53 (communication cable 51B) is detached, and the information transfer device 200A and the signal processing device 100 are then connected via the connector member 61, then connection is established with the third signal line from the third terminal 240C to the (+) terminal via the connector member 61. Also, the electric-apparatus-side terminal 110 that has been connected to the electric apparatus 53 during the operation is not used but is protected by the connector member 61 when the information transfer device 200A is connected.

In this manner, the information transfer device 200A can adjust power supplied from the input terminal 300 or the battery to a necessary voltage, then outputs the necessary voltage from the third terminal 240C, and supply the necessary voltage to the signal processing device 100 via the (+) terminal of the power supply terminal 64B.

Figure 21:
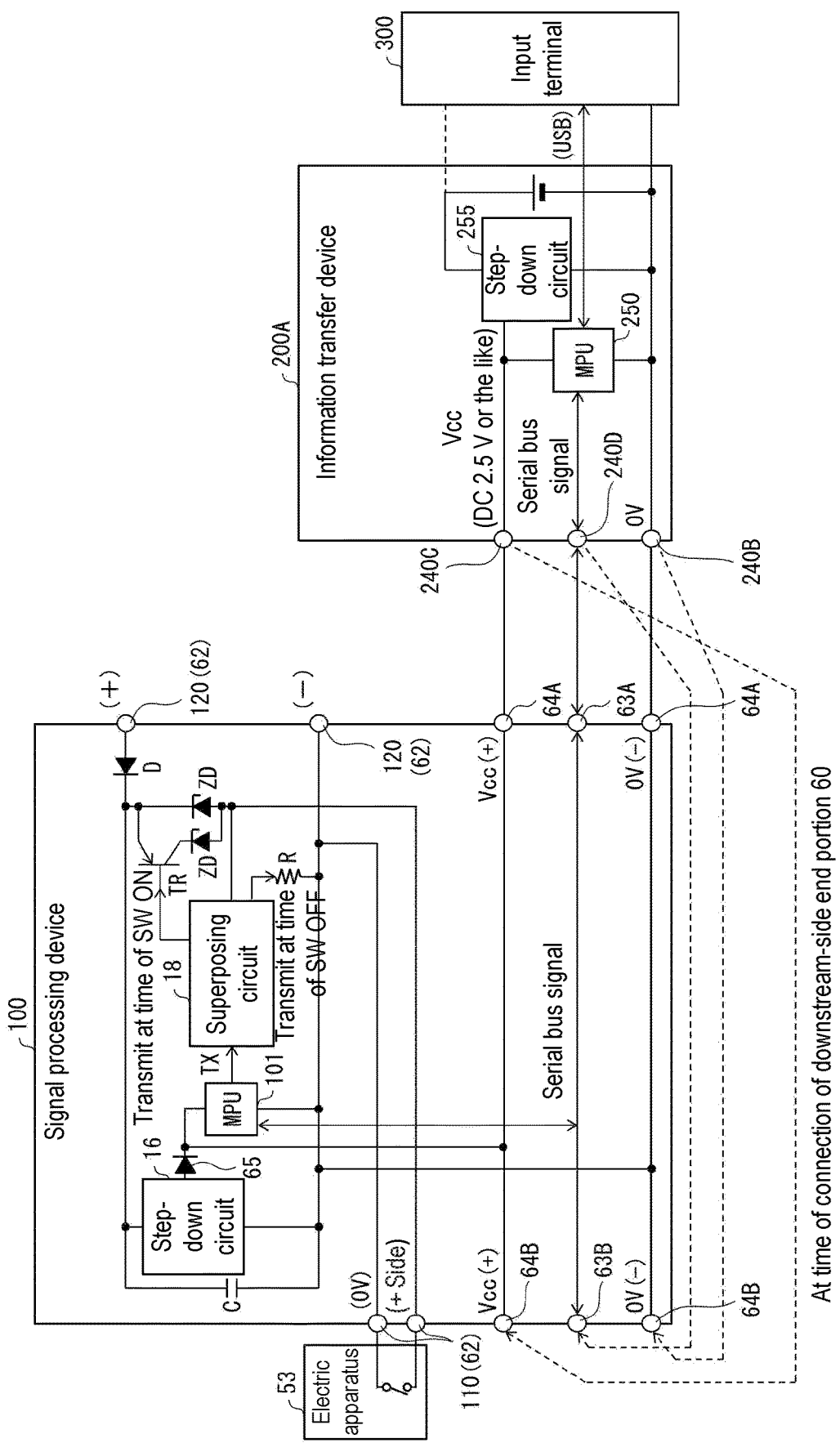
FIG. 21 is a diagram illustrating an example of circuit configurations of the signal processing device and the information transfer device in the configuration example (4) according to an aspect of the present disclosure.

FIG. 21 is a diagram illustrating an example of circuit configurations of the signal processing device 100 and the information transfer device 200A according to the configuration example (4) according to an aspect of the present disclosure.

<Information Transfer Device 200A>

The information transfer device 200A includes at least the MPU 250 and the step-down circuit 255.

The step-down circuit 255 adjusts power at a relatively low voltage (3 V or 5 V, for example) supplied from the battery or the input terminal 300 to a prescribed voltage, outputs the adjusted voltage to each circuit in the information transfer device 200A, steps down the supplied power to a prescribed voltage (2.5 V, for example) necessary to drive the signal processing device 100, and outputs the prescribed voltage to the signal processing device 100. In this manner, it is possible to supply power at a voltage of 2.5 V from the information transfer device 200A to the signal processing device 100 in the configuration example (4).

The MPU 250 operates as the writing control part 221 and the reading control part 225 of the transfer circuit 220A. In this configuration example, the MPU 250 that serves as the writing control part 221 converts written information acquired from the input terminal 300 into serial data and outputs the serial data from the fourth terminal 240D to the information transmission terminal 63 (63A or 63B) via the serial bus (second signal line). The MPU 250 that serves as the reading control part 225 acquires read information from the serial data input from the fourth terminal 240D and transfers the read information to the input terminal 300.

<Signal Processing Device 100>

The circuit configuration of the signal processing device 100 according to the configuration example (4) is similar to the circuit configuration of the signal processing device 100 according to the configuration examples (1) to (3) other than the following points.

While the signal processing device 100 includes the communication-device-side terminal 120 as the power supply terminal on the upstream side and the power supply terminal 64 as the power supply terminal on the downstream side in the configuration examples (1) to (3), the signal processing device 100 includes the power supply terminal 64A on the (+) side as the power supply terminal on the upstream side and the power supply terminal 64B on the (−) side as the power supply terminal on the downstream side in the configuration example.

Also, the signal processing device 100 includes an element 65 for preventing power supplied from the power supply terminal 64A or 64B from being output to the step-down circuit 16.

Also, the MPU 101 that operates as the information rewriting part 153 acquires written information from the serial data input via the information transmission terminal 63A or the information transmission terminal 63B and writes the written information in the information storage part 140.

Also, the MPU 101 that operates as an information reading part, which is not illustrated, reads information stored in the information storage part 140, converts read information into serial data, and outputs the serial data to the information transfer device 200A via the information transmission terminal 63A or the information transmission terminal 63B.

With the aforementioned configuration, the various terminals of the signal processing device 100 are protected by the connector member 61 during the operation similarly to the configuration examples (1) to (3). Therefore, it is possible to prevent degradation of the various terminals and to ensure that information can be accurately read and written between the input terminal 300 and the signal processing device 100.

Also, regardless of which of the upstream-side end portion 59 and the downstream-side end portion 60 of the cable casing 50 is detached at the time of maintenance, it is possible to connect the information transfer device 200A to the signal processing device 100 from the detached side and to read and write information similarly to the configuration examples (1) to (3). Therefore, convenience when the maintenance is performed is improved.

Moreover, it is possible to realize reading and writing of information by connecting the MPU 101 of the signal processing device 100 directly to the MPU 250 of the information transfer device 200A with the serial bus in this configuration example, and it is thus not necessary to provide a dedicated circuit and other electronic components to realize optical communication. Therefore, there is an advantage that the print circuit board (PCB) of the signal processing device 100 can be more reasonably configured as compared with the configuration examples (1) to (3).

In this configuration example, the signal processing device 100 further includes the power supply terminal 64A and the power supply terminal 64B for receiving power supply from the information transfer device 200A, and the MPU 101 receives power supply from the information transfer device 200A via the power supply terminal 64A or 63B.

With the aforementioned configuration, power is supplied to the MPU 101 by the dedicated power supply terminal 64A or 63B when the signal processing device 100 is connected to the information transfer device 200A, and it is thus only necessary for the information transfer device 200A to supply necessary minimum power (2.5 V, for example) to the signal processing device 100. As a result, there is no need to use the same method of supply power from the input/output unit 52, and there is an advantage that a degree of freedom in designing the signal processing device 100 is improved.

§ 7 Configuration Example (5)

In the configuration example (5), reading and writing of information between the information transfer device 200A and the signal processing device 100 is performed through serial communication similarly to the configuration example (4). Also, the first signal line used for superposed signal communication during the operation is used to supply power in the configuration example (5).

The configuration and the wiring of the signal processing device 100 in the configuration example (5) according to an aspect of the present disclosure will be described with reference to FIGS. 19 and 20. The configuration example (5) is different from the configuration example (4) illustrated in FIGS. 19 and 20 as follows.

The signal processing device 100 uses the communication-device-side terminal 120 as the power supply terminal 64A at the time of maintenance instead of including the power supply terminal 64A in the configuration example (4).

The signal processing device 100 uses the electric-apparatus-side terminal 110 as the power supply terminal 64B instead of including the power supply terminal 64B in the configuration example (4).

When the information transfer device 200A is connected to the signal processing device 100 from the upstream side at the time of maintenance, for example, at the time of replacement of the communication cable 51A, the third terminal 240C and the (+) terminal of the communication-device-side terminal 120 are connected via a signal line, and the second terminal 240B and the (−) terminal of the communication-device-side terminal 120 are connected via a signal line.

In this manner, power output from the information transfer device 200A is supplied to the signal processing device 100 via the communication-device-side terminal 120. As a result, it is possible to reduce the number of terminals and the number of signal lines provided at the upstream-side end portion 59.

When the information transfer device 200A is connected to the signal processing device 100 from the downstream side at the time of maintenance, for example, at the time of replacement of the electric apparatus 53, the third terminal 240C and the (+) terminal of the electric-apparatus-side terminal 110 are connected via a signal line, and the second terminal 240B and the (−) terminal of the electric-apparatus-side terminal 110 are connected via a signal line.

In this manner, power output from the information transfer device 200A is supplied to the signal processing device 100 via the electric-apparatus-side terminal 110. As a result, it is possible to reduce the number of terminals and the number of signal lines provided at the downstream-side end portion 60.

Figure 22:
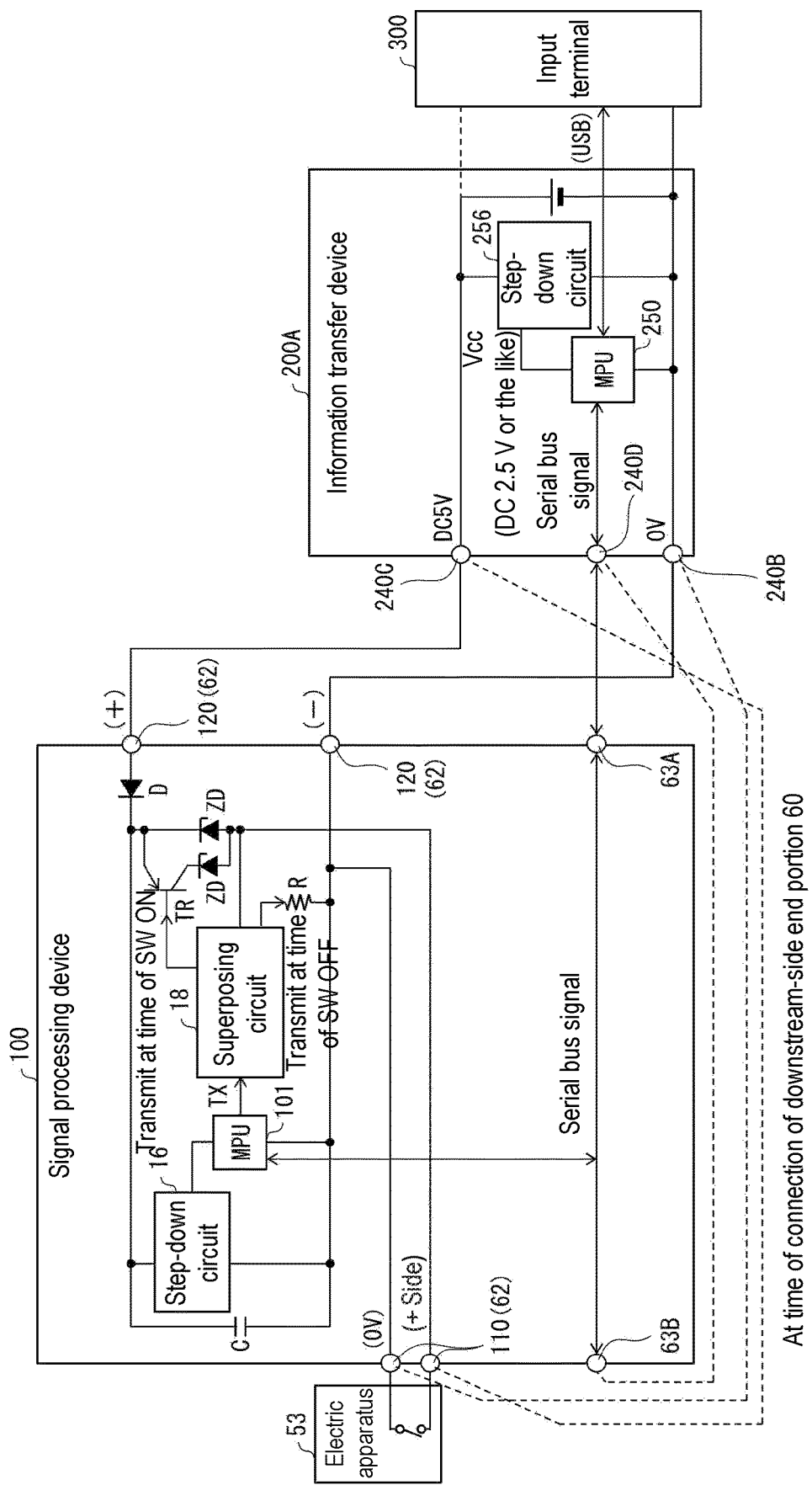
FIG. 22 is a diagram illustrating an example of circuit configurations of the signal processing device and the information transfer device in a configuration example (5) according to an aspect of the present disclosure.

FIG. 22 is a diagram illustrating an example of circuit configurations of the signal processing device 100 and the information transfer device 200A in the configuration example (5) according to an aspect of the present disclosure.

<Information Transfer Device 200A>

The information transfer device 200A includes at least the MPU 250 and the step-down circuit 256.

The step-down circuit 256 adjusts a power at a relatively low voltage (5 V, for example) supplied from the input terminal 300 to a prescribed voltage (2.5 V, for example) and outputs the prescribed voltage to each circuit in the information transfer device 200A.

In this configuration example, power supplied from the input terminal 300 is output directly from the third terminal 240C to the signal processing device 100 without intervention of the step-down circuit 256. Alternatively, in a case in which a battery (3 V) is employed as a power source in this configuration example, power supplied from the battery is boosted from 3 V to 5 V via the step-down circuit, which is not illustrated, and is then output from the third terminal 240C to the signal processing device 100. In this manner, it is possible to supply power at a prescribed voltage (5 V, for example) necessary to drive the signal processing device 100 to the signal processing device 100.

The MPU 250 operates as the writing control part 221 and the reading control part 225 similarly to the configuration example (4).

<Signal Processing Device 100>

The circuit configuration of the signal processing device 100 according to the configuration example (5) is similar to the circuit configuration of the signal processing device 100 according to the configuration example (4) other than the following points.

While the signal processing device 100 includes the power supply terminals 64A on the (+) and (−) sides on the upstream side and includes the power supply terminals 64B on the (+) and (−) sides on the downstream side in the configuration example (4), these terminals are not included in this configuration example.

On the upstream side, the signal line from the third terminal 240C is connected to the (+) terminal of the communication-device-side terminal 120, and the signal line from the second terminal 240B is connected to the (−) terminal of the communication-device-side terminal 120. On the downstream side, the signal line from the third terminal 240C is connected to the (+) terminal of the electric-apparatus-side terminal 110, and the signal line from the second terminal 240B is connected to the (−) terminal of the electric-apparatus-side terminal 110.

Therefore, the element 65 for preventing power supplied from the power supply terminal 64B from being output to the step-down circuit 16 is included in this configuration example.

The MPU 101 operates as the information rewriting part 153 and an information reading part, which is not illustrated, similarly to the configuration example (4).

With the aforementioned configuration, the various terminals of the signal processing device 100 are protected by the connector member 61 during the operation similarly to the configuration examples (1) to (3). Therefore, it is possible to prevent degradation of the various terminals and to ensure that information is accurately read and written between the input terminal 300 and the signal processing device 100.

Also, regardless of which of the upstream-side end portion 59 and the downstream-side end portion 60 of the cable casing 50 is detached at the time of maintenance, it is possible to connect the information transfer device 200A to the signal processing device 100 from the detached side and to read and write information similarly to the configuration examples (1) to (3). Therefore, convenience when the maintenance is performed is improved.

Moreover, it is possible to realize reading and writing information by connecting the MPU 101 of the signal processing device 100 directly to the MPU 250 of the information transfer device 200A with a serial bus, and it is thus not necessary to provide a dedicated circuit and other electronic components to realize optical communication similarly to the configuration example (4). Therefore, there is an advantage that the print circuit board (PCB) of the signal processing device 100 can be more reasonably configured as compared with the configuration examples (1) to (3).

Moreover, since the terminals (the electric-apparatus-side terminal 110 and the communication-device-side terminal 120) used for superposed signal communication are used as the power supply terminals during the operation in this configuration example, it is not necessary to separately provide terminals dedicated to supply power. Therefore, it is possible to reduce the number of terminals in the signal processing device 100 and to cause the upstream-side end portion 59 and the downstream-side end portion 60 of the cable casing 50 to have simple configurations or shapes as compared with those in the configuration example (4).

§ 8 Modification Example

In the configuration examples (4) and (5), it is possible to employ a communication means using an inter-integrated circuit (I2C) or a universal asynchronous receiver transmitter (UART), for example, as well as the SPI as a means for realizing two-way serial communication between the MPUs of the information transfer device 200A and the signal processing device 100.

In a case in which the I2C is employed, the serial bus (second signal line) is configured with two lines, namely a signal line (SDA) for transmitting serial data signals and a signal line (SDL) for transmitting serial clock signals, and therefore, two information transmission terminals 63 are provided at each of the upstream-side end portion 59 and the downstream-side end portion 60.

In a case in which the UART is employed, two lines, namely a signal line for uplink transfer and a signal line for downlink transfer are included, and two information transmission terminals 63 are provided at each of the upstream-side end portion 59 and the downstream-side end portion 60.

(Implementation Example Using Software)

Control blocks of the signal processing device 100, the information transfer device 200A, and the input terminal 300 may be realized using a logic circuit (hardware) formed by an integrated circuit (IC chip) or may be realized by software.

In the latter case, the signal processing device 100, the information transfer device 200A, and the input terminal 300 include a computer that executes commands of a program that is software for realizing each function. The computer includes one or more processors, for example, and a computer readable recording medium with the program stored therein. Then, the objective of the present invention is achieved by the processor reading and executing the program from the recording medium in the computer. As the processor, it is possible to use a central processing unit (CPU), for example. As the recording medium, it is possible to use a "non-transitory tangible medium" such as a tape, a disc, a card, a semiconductor memory, a programmable logic circuit, or the like as well as a read only memory (ROM). Also, a random access memory (RAM) or the like for developing the program may further be included. Also, the program may be supplied to the computer via an arbitrary transmission medium (such as a communication network or broadcasting waves) that can transmit the program. In addition, an aspect of the present invention can also be realized in the form of data signals embedded in transmission carriers in which the program is implemented by electronic transmission.

The present invention employs the following configuration in order to solve the aforementioned problem as an example of the present disclosure.

In other words, a signal processing device according to an aspect of the present disclosure is a signal processing device that mediates communication between an electric apparatus that operates on a downstream side of a communication system and an apparatus control device that controls one or more of the electric apparatuses on an upstream side, the signal processing device including: a superposing circuit that generates a superposed signal obtained by superposing a data signal indicative of prescribed information on an operation signal in accordance with a state of operation elements of the electric apparatuses or an operation signal for controlling the operation elements; an information storage part that stores the prescribed information; a signal transmission terminal that inputs/outputs the operation signal or the superposed signal to/from the electric apparatuses or the apparatus control device; and an information transmission terminal that inputs/outputs the prescribed information to/from an information transfer device which executes at least one of reading of the prescribed information stored in the information storage part and writing of the prescribed information in the information storage part, in which the signal processing device is connected to an external device including the electric apparatuses, the apparatus control device, and the information transfer device via a connector member, and the signal transmission terminal and the information transmission terminal are provided in areas that are inside the connector member in a state where the signal processing device is connected to the external device via the connector member.

With this configuration, the information transmission terminal is provided in the area of the signal processing device that is inside the connector member in a state in which the signal processing device is connected to the external device via the connector member similarly to the signal transmission terminal. Therefore, the information transmission terminal is protected by the connector member similarly to the signal transmission terminal when the signal processing device is connected to the external device via the connector member even during an operation or maintenance of the communication system. As a result, it is possible to ensure that information is accurately read and written between the information transfer device and the signal processing device, and there is thus an advantage that apparatuses, devices, and the like that are not compatible with communication using superposed signals can also be incorporated and used in the aforementioned series of system via the signal processing device.

The signal processing device according to the aspect may further include: an upstream-side surface that is inside the first connector member for connection to the apparatus control device in a state where the signal processing device is connected to the apparatus control device; and a downstream-side surface that is inside the second connector member for connection to the electric apparatuses in a state in which the signal processing device is connected to the electric apparatuses, and the information transmission terminal may be provided on each of the upstream-side surface and the downstream-side surface.

With this configuration, it is possible to connect the information transfer device using the information transmission terminal provided in the upstream-side surface and to read and write information when the connector member is detached from the upstream-side surface. It is possible to connect the information transfer device using the information transmission terminal provided in the downstream-side surface and to read and write information when the connector member is detached from the downstream-side surface. Regardless of which of the connector members on the upstream side and the downstream side is detached, the information transfer device can be connected from the detached side, and information can thus be read and written. As a result, it is possible to easily read and write information when connection of the apparatus control device is cut from the upstream-side surface of the signal processing device to perform maintenance or when connection of the electric apparatus is cut from the downstream-side surface of the signal processing device to perform maintenance, and there is thus an advantage that convenience of the maintenance is improved.

In the signal processing device according to the aspect, the information transmission terminal may be an optical input terminal that inputs an optical signal, and the signal processing device may include a control part that writes information regarding the optical signal input from the information transfer device in the information storage part and outputs information stored in the information storage part as the superposed signal from the signal transmission terminal to the information transfer device in the optical input terminal.

With the aforementioned configuration, it is possible to realize optical communication for writing information without providing a window part that transmits light in the casing or the like of the signal processing device, and there is thus no disadvantage that information cannot be read and written due to contamination of the window part. As a result, it is possible to ensure that information can be accurately read and written between the information transfer device and the signal processing device.

In the signal processing device according to the aspect, the information transmission terminal may include an optical input terminal that inputs an optical signal and an optical output terminal that outputs an optical signal, and the signal processing device may include a control part that writes information regarding an optical signal input from the information transfer device in the information storage part and outputs information stored in the information storage part as an optical signal from the optical output terminal to the information transfer device in the optical input terminal.

With the aforementioned configuration, it is possible to realize reading in addition to writing of information through optical communication in addition to realizing the optical communication without providing a window part. In this manner, there is no need to perform superposed signal communication to read information, and power supply can be performed with only a relatively low voltage without maintaining a high voltage for the power supply to the signal processing device. Also, there is an advantage that it is not necessary to provide a circuit for receiving superposed signals in the information transfer device that reads information.

In the signal processing device according to the aspect, the information transmission terminal may be an electrical signal input/output terminal that inputs/outputs an electrical signal, and the signal processing device may include a control part that writes information regarding a serial signal input from the information transfer device in the information storage part and outputs information stored in the information storage part as a serial signal from the electrical signal input/output terminal to the information transfer device in the electrical signal input/output terminal.

With the aforementioned configuration, it is possible to connect the control part of the signal processing device directly to the control part of the information transfer device in series with a serial bus and to realize reading and writing of information. Therefore, it is not necessary to provide a dedicated circuit and other electronic components for realizing optical communication, and there is an advantage that it is possible to easily and reasonably configure the signal processing device.

In the signal processing device according to the aspect, the control part may receive power supply from the information transfer device via the signal transmission terminal.

With the aforementioned configuration, the signal processing device receives the power supply from the signal transmission terminal when the signal processing device is connected to the apparatus control device during the operation of the communication system, and it is also possible to receive the power supply by a power supply method similarly to this even when the signal processing is connected to the information transfer device at the time of maintenance or the like. Therefore, there is an advantage that it is not necessary to separately provide a wire for the power supply at the time of connection to the information transfer device.

The signal processing device according to the aspect may further include: a power supply terminal that is for receiving power supply from the information transfer device, and the control part may receive power supply from the information transfer device via the power supply terminal.

With the aforementioned configuration, since the power is supplied to the control part by a dedicated power supply terminal when the signal processing device is connected to the information transfer device, it is only necessary for the information transfer device to supply minimum necessary power to the signal processing device. As a result, there is no need to use the same method of supply power from the apparatus control device, and there is an advantage that it is possible to design the signal processing device without such restriction.

The present invention is not limited to the aforementioned embodiments, various modifications can also be made within the scope described in the claims, and embodiments obtained by appropriately combining technical means disclosed in different embodiments are also included within the technical scope of the present invention.

The invention claimed is:

1. A signal processing device that mediates communication between an electric apparatus that operates on a downstream side of a communication system and an apparatus control device that controls one or more of the electric apparatuses on an upstream side, the signal processing device comprising:
a superposing circuit that generates a superposed signal obtained by superposing a data signal indicative of prescribed information on an operation signal in accordance with a state of operation elements of the electric apparatuses or an operation signal for controlling the operation elements;
an information storage part that stores the prescribed information;
a signal transmission terminal that inputs/outputs the operation signal or the superposed signal to/from the electric apparatuses or the apparatus control device; and
an information transmission terminal that inputs/outputs the prescribed information to/from an information transfer device which executes at least one of reading of the prescribed information stored in the information storage part and writing of the prescribed information in the information storage part,
wherein the signal processing device is connected to an external device including the electric apparatuses, the apparatus control device, and the information transfer device via a connector member, and
the signal transmission terminal and the information transmission terminal are provided in areas that are inside the connector member in a state where the signal processing device is connected to the external device via the connector member.

2. The signal processing device according to claim 1, further comprising:
an upstream-side surface that is inside a first connector member for connection to the apparatus control device in a state where the signal processing device is connected to the apparatus control device; and
a downstream-side surface that is inside a second connector member for connection to the electric apparatuses in a state in which the signal processing device is connected to the electric apparatuses,
wherein the information transmission terminal is provided on each of the upstream-side surface and the downstream-side surface.

3. The signal processing device according to claim 1,
wherein the information transmission terminal is an optical input terminal that inputs an optical signal, and
the signal processing device includes a control part that writes information regarding the optical signal input from the information transfer device in the information storage part and outputs information stored in the information storage part as the superposed signal from the signal transmission terminal to the information transfer device in the optical input terminal.

4. The signal processing device according to claim 1,
wherein the information transmission terminal includes an optical input terminal that inputs an optical signal and an optical output terminal that outputs an optical signal, and
the signal processing device includes a control part that writes information regarding an optical signal input from the information transfer device in the information storage part and outputs information stored in the information storage part as an optical signal from the optical output terminal to the information transfer device in the optical input terminal.

5. The signal processing device according to claim 1,
wherein the information transmission terminal is an electrical signal input/output terminal that inputs/outputs an electrical signal, and
the signal processing device includes a control part that writes information regarding a serial signal input from the information transfer device in the information storage part and outputs information stored in the information storage part as a serial signal from the electrical signal input/output terminal to the information transfer device in the electrical signal input/output terminal.

6. The signal processing device according to claim 3, wherein the control part receives power supply from the information transfer device via the signal transmission terminal.

7. The signal processing device according to claim 4, further comprising:
a power supply terminal that is for receiving power supply from the information transfer device,
wherein the control part receives power supply from the information transfer device via the power supply terminal.

8. The signal processing device according to claim 2,
wherein the information transmission terminal is an optical input terminal that inputs an optical signal, and
the signal processing device includes a control part that writes information regarding the optical signal input from the information transfer device in the information storage part and outputs information stored in the information storage part as the superposed signal from the signal transmission terminal to the information transfer device in the optical input terminal.

9. The signal processing device according to claim 2,
wherein the information transmission terminal includes an optical input terminal that inputs an optical signal and an optical output terminal that outputs an optical signal, and
the signal processing device includes a control part that writes information regarding an optical signal input from the information transfer device in the information storage part and outputs information stored in the optical output terminal to the information transfer device in the optical input terminal.

10. The signal processing device according to claim 2, wherein the information transmission terminal is an electrical signal input/output terminal that inputs/outputs an electrical signal, and the signal processing device includes a control part that writes information regarding a serial signal input from the information transfer device in the information storage part and outputs information stored in the information storage part as a serial signal from the electrical signal input/output terminal to the information transfer device in the electrical signal input/output terminal.

11. The signal processing device according to claim 4, wherein the control part receives power supply from the information transfer device via the signal transmission terminal.

12. The signal processing device according to claim 5, wherein the control part receives power supply from the information transfer device via the signal transmission terminal.

\* \* \* \* \*